US012700968B2

(12) United States Patent
Asterjadhi et al.

(10) Patent No.: US 12,700,968 B2
(45) Date of Patent: Aug. 4, 2026

(54) SOUNDING TECHNIQUES FOR ULTRA-HIGH RELIABILITY COMMUNICATIONS

(71) Applicant: QUALCOMM Incorporated, San Diego, CA (US)

(72) Inventors: Alfred Asterjadhi, San Diego, CA (US); Sameer Vermani, San Diego, CA (US); Jialing Li Chen, San Diego, CA (US); George Cherian, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 462 days.

(21) Appl. No.: 18/331,738

(22) Filed: Jun. 8, 2023

(65) Prior Publication Data

US 2024/0413948 A1     Dec. 12, 2024

(51) Int. Cl.
*H04L 5/00*          (2006.01)
*H04B 7/06*          (2006.01)
(Continued)

(52) U.S. Cl.
CPC .......... *H04L 5/0051* (2013.01); *H04B 7/0617* (2013.01); *H04W 84/12* (2013.01)

(58) Field of Classification Search
CPC ... H04L 5/0051; H04L 5/0094; H04L 5/0048; H04B 7/0617; H04B 7/0626;
(Continued)

(56) References Cited

U.S. PATENT DOCUMENTS

2013/0301502 A1*  11/2013  Kwon ............... H04W 52/0216
                                                       370/311
2017/0070914 A1*   3/2017  Chun ...................... H04W 4/70
(Continued)

FOREIGN PATENT DOCUMENTS

EP            4561164 A1 *  5/2025   ........ H04W 72/0453
WO     WO-2022261409 A1    12/2022
(Continued)

OTHER PUBLICATIONS

International Search Report and Written Opinion—PCT/US2024/029645—ISA/EPO—Oct. 2, 2024.
(Continued)

*Primary Examiner* — Xuan Lu
(74) *Attorney, Agent, or Firm* — Holland & Hart LLP

(57)          ABSTRACT

This disclosure provides methods, components, devices, and systems that support sounding techniques for ultra-high reliability (UHR) communications. In some implementations, a first communication device may receive a null data packet announcement (NDPA) frame associated with a UHR NDPA variant type. The NDPA frame may include sounding information for communication devices that support UHR communications. The first communication device may receive a null data packet (NDP) in accordance with the sounding information, and may perform UHR communications based on measurements of the NDP. In some other implementations, the first communication device may receive a trigger frame that indicates the NDPA, a sounding mode for transmission of the NDP, and parameters for transmission of a compressed beamforming frame (CBF) associated with the NDP. The first communication device may transmit or receive the NDP in accordance with the sounding mode, and may receive or transmit the CBF using the parameters.

14 Claims, 20 Drawing Sheets

(51) Int. Cl.

| | |
|---|---|
| *H04W 8/22* | (2009.01) |
| *H04W 8/24* | (2009.01) |
| *H04W 24/10* | (2009.01) |
| *H04W 84/12* | (2009.01) |

(58) Field of Classification Search
CPC ...... H04B 7/0658; H04W 84/12; H04W 8/24; H04W 8/22; H04W 24/10
See application file for complete search history.

(56) References Cited

U.S. PATENT DOCUMENTS

| 2022/0322348 | A1* | 10/2022 | Park | ..................... | H04B 7/0617 |
|---|---|---|---|---|---|
| 2024/0022383 | A1* | 1/2024 | Fang | ..................... | H04L 5/0053 |
| 2024/0137983 | A1* | 4/2024 | Cariou | .................. | H04L 5/0064 |
| 2024/0146492 | A1* | 5/2024 | Baykas | .............. | H04L 25/0202 |
| 2024/0291536 | A1* | 8/2024 | Katla | ..................... | H04W 8/22 |
| 2024/0292269 | A1* | 8/2024 | Wu | ..................... | H04W 28/065 |
| 2024/0292345 | A1* | 8/2024 | Lanante | ................ | H04W 52/38 |
| 2024/0333463 | A1* | 10/2024 | Kim | ..................... | H04L 5/0094 |
| 2025/0176045 | A1* | 5/2025 | Chun | .................... | H04W 76/15 |

FOREIGN PATENT DOCUMENTS

| WO | WO-2024112584 | A1 * | 5/2024 | .......... H04L 5/0091 |
|---|---|---|---|---|
| WO | WO-2024128969 | A2 | 6/2024 | |

OTHER PUBLICATIONS

Lim D (LG Electronics)., et al., "Consideration for NDPA in 11BF", IEEE Draft, 11-21-1751-03-00BF-CONSIDERATION-FOR-NDPAIN-11BF, IEEE-SA Mentor, Piscataway, NJ USA, vol. 802.11bf, No. 3, Feb. 18, 2022, pp. 1-24, XP068189003, the whole document.

Suh J (Huawei)., et al., "NDPA for Future Amendments", IEEE Draft, 11-21-1977-00-00BE-NDPA-FOR-FUTURE-AMEND-MENTS, IEEE-SA Mentor, Piscataway, NJ USA, vol. 802.11 EHT, 802.11be, Dec. 6, 2021, pp. 1-11, XP068187322, the whole document.

* cited by examiner

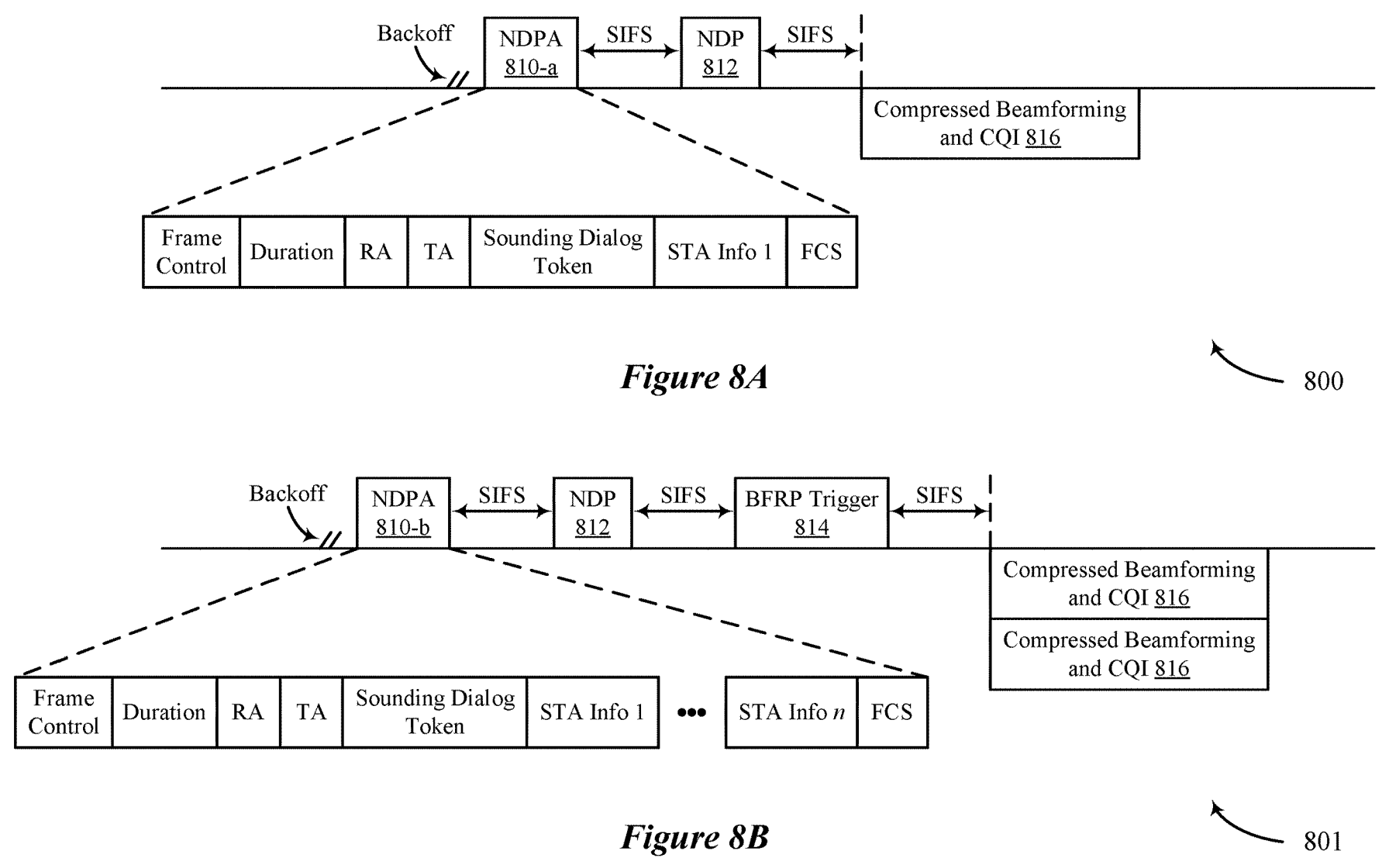

| Frame Control | Duration | RA | TA | Sounding Dialog Token | STA Info 1 | FCS |

Backoff — NDPA 810-a — SIFS — NDP 812 — SIFS — Compressed Beamforming and CQI 816

_Figure 8A_

_801_

| Frame Control | Duration | RA | TA | Sounding Dialog Token | STA Info 1 | ••• | STA Info _n_ | FCS |

Backoff — NDPA 810-b — SIFS — NDP 812 — SIFS — BFRP Trigger 814 — SIFS — Compressed Beamforming and CQI 816 / Compressed Beamforming and CQI 816

_Figure 8B_

NDPA Component

1525

UHR Component

1535

CBF Component

1545

Sounding Component

1530

Trigger Frame Component

1540

BFRP Component

1550

1520

1500

| NDPA Frame Component | | NDP Component |
|---|---|---|
| 1625 | | 1630 |
| UHR Communication Component | | CBF Report Component |
| 1635 | | 1645 |
| MAP Component | | Triggering Component |
| 1650 | | 1655 |
| | | Beacon Frame Component |
| | | 1660 |

1620

1600

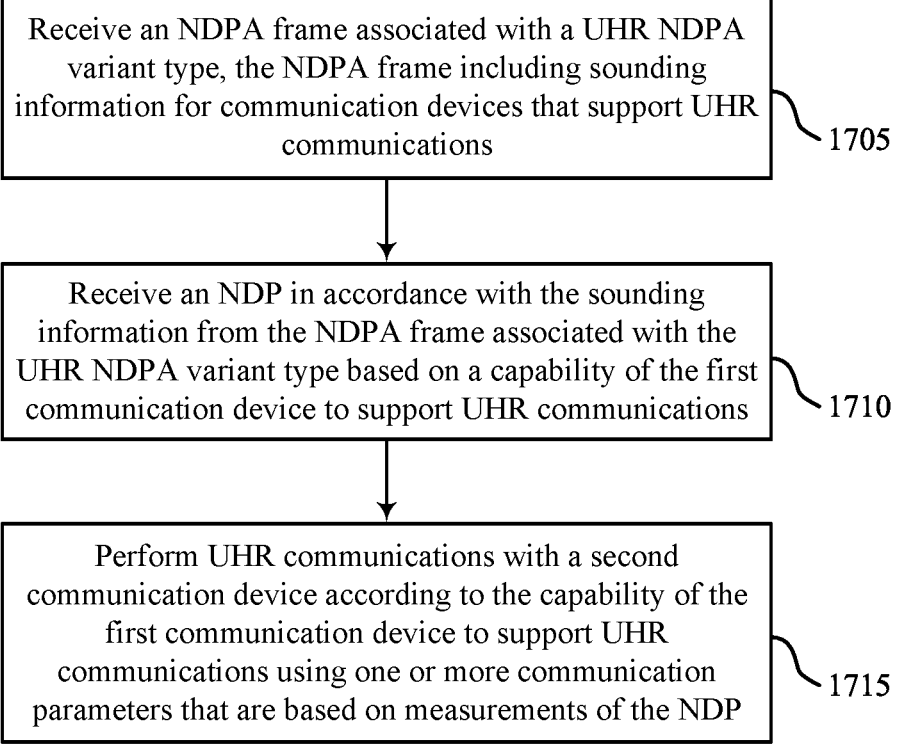

Receive an NDPA frame associated with a UHR NDPA variant type, the NDPA frame including sounding information for communication devices that support UHR communications ⟍1705

Receive an NDP in accordance with the sounding information from the NDPA frame associated with the UHR NDPA variant type based on a capability of the first communication device to support UHR communications ⟍1710

Perform UHR communications with a second communication device according to the capability of the first communication device to support UHR communications using one or more communication parameters that are based on measurements of the NDP ⟍1715

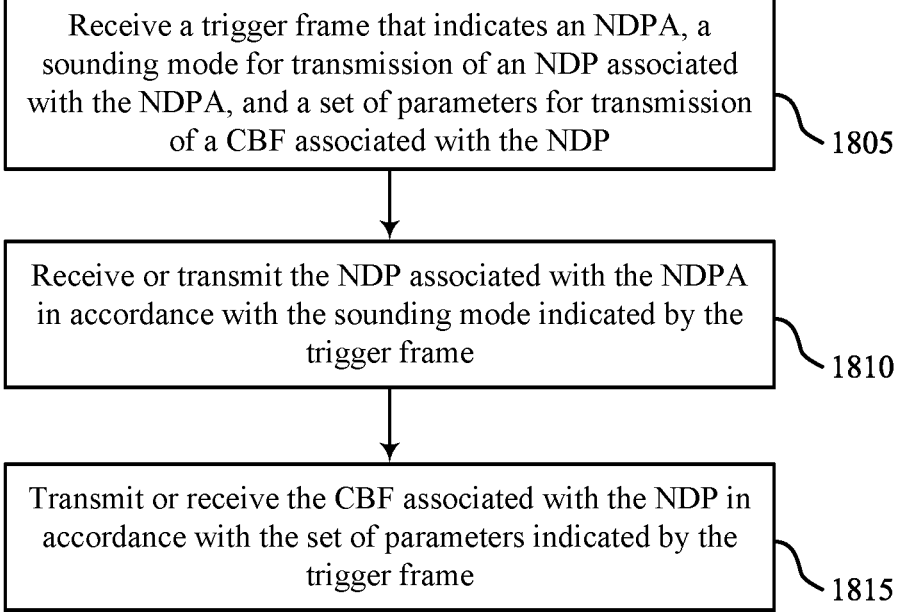

Receive a trigger frame that indicates an NDPA, a sounding mode for transmission of an NDP associated with the NDPA, and a set of parameters for transmission of a CBF associated with the NDP    1805

Receive or transmit the NDP associated with the NDPA in accordance with the sounding mode indicated by the trigger frame    1810

Transmit or receive the CBF associated with the NDP in accordance with the set of parameters indicated by the trigger frame    1815

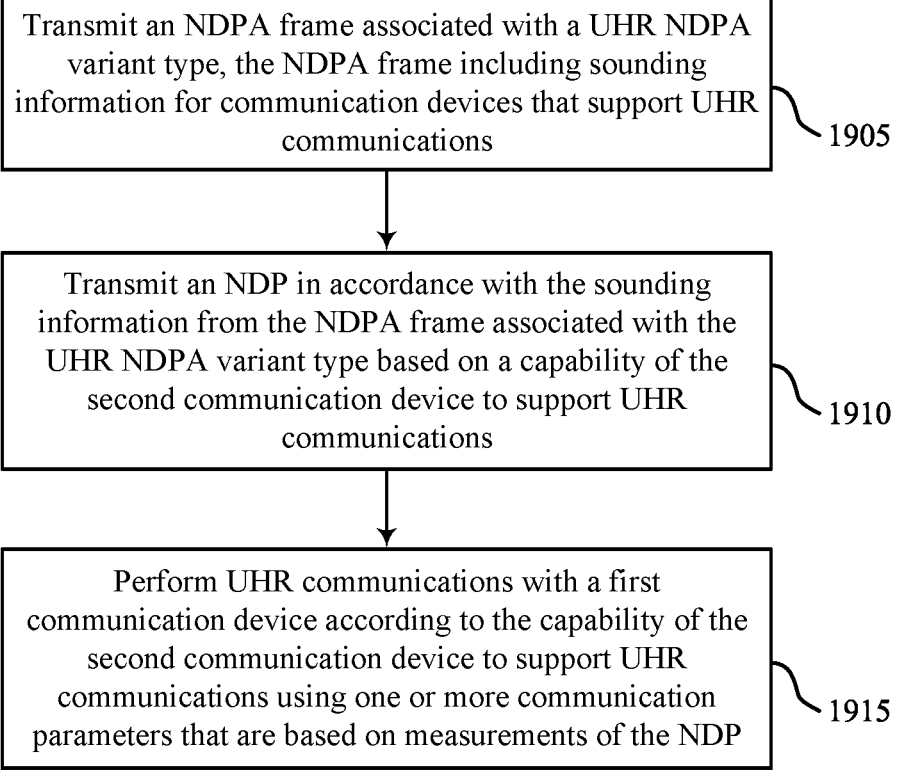

Transmit an NDPA frame associated with a UHR NDPA variant type, the NDPA frame including sounding information for communication devices that support UHR communications — 1905

Transmit an NDP in accordance with the sounding information from the NDPA frame associated with the UHR NDPA variant type based on a capability of the second communication device to support UHR communications — 1910

Perform UHR communications with a first communication device according to the capability of the second communication device to support UHR communications using one or more communication parameters that are based on measurements of the NDP — 1915

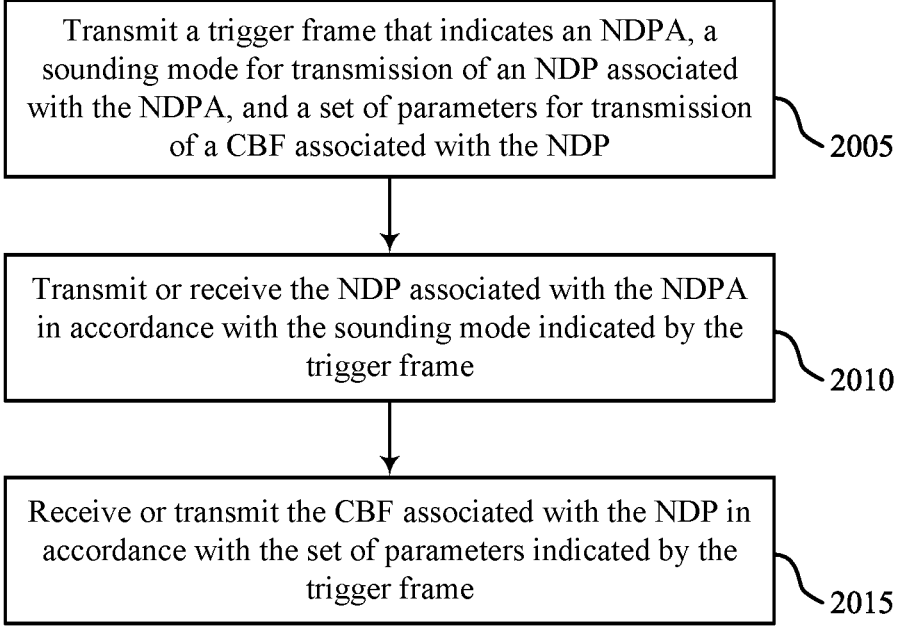

Transmit a trigger frame that indicates an NDPA, a sounding mode for transmission of an NDP associated with the NDPA, and a set of parameters for transmission of a CBF associated with the NDP

2005

Transmit or receive the NDP associated with the NDPA in accordance with the sounding mode indicated by the trigger frame

2010

Receive or transmit the CBF associated with the NDP in accordance with the set of parameters indicated by the trigger frame

SOUNDING TECHNIQUES FOR ULTRA-HIGH RELIABILITY COMMUNICATIONS

TECHNICAL FIELD

This disclosure relates to wireless communication and, more specifically, to sounding techniques for ultra-high reliability (UHR) communications.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some WLANs, a null data packet announcement (NDPA) frame may precede transmission of a null data packet (NDP). Some NDPAs may be associated with a particular variant, such as an extremely high throughput (EHT) variant or a high efficiency (HE) variant. However, the NDPA frame structure may support a limited quantity of NDPA variants.

SUMMARY

The systems, methods, and devices of this disclosure each have several innovative aspects, no single one of which is solely responsible for the desirable attributes disclosed herein.

One innovative aspect of the subject matter described in this disclosure can be implemented in an apparatus for wireless communications at a first communication device. The apparatus may include at least one processor, at least one memory coupled with the at least one processor, and instructions stored in the at least one memory. The instructions may be executable by the at least one processor to cause the apparatus to: receive a null data packet announcement (NDPA) frame associated with an ultra-high reliability (UHR) NDPA variant type, the NDPA frame including sounding information for communication devices that support UHR communications; receive a null data packet (NDP) in accordance with the sounding information from the NDPA frame associated with the UHR NDPA variant type based on a capability of the first communication device to support UHR communications; and perform UHR communications with a second communication device according to the capability of the first communication device to support UHR communications using one or more communication parameters that are based on measurements of the NDP.

Another innovative aspect of the subject matter described in this disclosure can be implemented in a method for wireless communications at a first communication device. The method may include: receiving an NDPA frame associated with a UHR NDPA variant type, the NDPA frame including sounding information for communication devices that support UHR communications; receiving an NDP in accordance with the sounding information from the NDPA frame associated with the UHR NDPA variant type based on a capability of the first communication device to support UHR communications; and performing UHR communications with a second communication device according to the capability of the first communication device to support UHR communications using one or more communication parameters that are based on measurements of the NDP.

Another innovative aspect of the subject matter described in this disclosure can be implemented in an apparatus for wireless communications at a first communication device. The apparatus may include: means for receiving an NDPA frame associated with a UHR NDPA variant type, the NDPA frame including sounding information for communication devices that support UHR communications: means for receiving an NDP in accordance with the sounding information from the NDPA frame associated with the UHR NDPA variant type based on a capability of the first communication device to support UHR communications; and means for performing UHR communications with a second communication device according to the capability of the first communication device to support UHR communications using one or more communication parameters that are based on measurements of the NDP.

Another innovative aspect of the subject matter described in this disclosure can be implemented in a non-transitory computer-readable medium storing code for wireless communications at a first communication device. The code may include instructions executable by at least one processor to: receive an NDPA frame associated with a UHR NDPA variant type, the NDPA frame including sounding information for communication devices that support UHR communications; receive an NDP in accordance with the sounding information from the NDPA frame associated with the UHR NDPA variant type based on a capability of the first communication device to support UHR communications; and perform UHR communications with a second communication device according to the capability of the first communication device to support UHR communications using one or more communication parameters that are based on measurements of the NDP.

In some examples of the methods, apparatuses, and non-transitory computer-readable media described herein, receiving the NDPA frame may include operations, features, means, or instructions for receiving, via the NDPA frame, a sounding dialog token field including a four-bit NDPA variant type sub-field that indicates the UHR NDPA variant type of the NDPA frame.

In some examples of the methods, apparatuses, and non-transitory computer-readable media described herein, receiving the NDPA frame may include operations, features, means, or instructions for receiving, via the NDPA frame, a station (STA) information field including an association identifier (AID) associated with the UHR NDPA variant type, an NDPA variant extension sub-field that indicates the UHR NDPA variant type, one or more beamforming parameters that pertain to a sounding sequence associated with the NDP, a sounding mode for transmission of the NDP, or a combination thereof.

One innovative aspect of the subject matter described in this disclosure can be implemented in an apparatus for wireless communications at a first communication device. The apparatus may include at least one processor, at least one memory coupled with the at least one processor, and instructions stored in the at least one memory. The instructions may be executable by the at least one processor to cause the apparatus to: receive a trigger frame that indicates an NDPA, a sounding mode for transmission of an NDP associated with the NDPA, and a set of parameters for transmission of a compressed beamforming frame (CBF) associated with the NDP; receive or transmit the NDP associated with the NDPA in accordance with the sounding mode indicated by the trigger frame; and transmit or receive the CBF associated with the NDP in accordance with the set of parameters indicated by the trigger frame.

Another innovative aspect of the subject matter described in this disclosure can be implemented in a method for wireless communications at a first communication device. The method may include: receiving a trigger frame that indicates an NDPA, a sounding mode for transmission of an NDP associated with the NDPA, and a set of parameters for transmission of a CBF associated with the NDP; receiving or transmitting the NDP associated with the NDPA in accordance with the sounding mode indicated by the trigger frame; and transmitting or receiving the CBF associated with the NDP in accordance with the set of parameters indicated by the trigger frame.

Another innovative aspect of the subject matter described in this disclosure can be implemented in an apparatus for wireless communications at a first communication device. The apparatus may include: means for receiving a trigger frame that indicates an NDPA, a sounding mode for transmission of an NDP associated with the NDPA, and a set of parameters for transmission of a CBF associated with the NDP; means for receiving or transmitting the NDP associated with the NDPA in accordance with the sounding mode indicated by the trigger frame; and means for transmitting or receiving the CBF associated with the NDP in accordance with the set of parameters indicated by the trigger frame.

Another innovative aspect of the subject matter described in this disclosure can be implemented in a non-transitory computer-readable medium storing code for wireless communications at a first communication device. The code may include instructions executable by at least one processor to: receive a trigger frame that indicates an NDPA, a sounding mode for transmission of an NDP associated with the NDPA, and a set of parameters for transmission of a CBF associated with the NDP; receive or transmit the NDP associated with the NDPA in accordance with the sounding mode indicated by the trigger frame; and transmit or receive the CBF associated with the NDP in accordance with the set of parameters indicated by the trigger frame.

In some examples of the methods, apparatuses, and non-transitory computer-readable media described herein, receiving the trigger frame may include operations, features, means, or instructions for receiving, via the trigger frame, a four-bit trigger type field indicating the NDPA.

In some examples of the methods, apparatuses, and non-transitory computer-readable media described herein, receiving the trigger frame may include operations, features, means, or instructions for receiving, via the trigger frame, a common information field indicating one or more parameters associated with the NDPA, the one or more parameters including a variant type of the NDPA, the sounding mode for transmission of the NDP, one or more beamforming parameters that pertain to a sounding sequence associated with the NDP, or a combination thereof.

One innovative aspect of the subject matter described in this disclosure can be implemented in an apparatus for wireless communications at a second communication device. The apparatus may include at least one processor, at least one memory coupled with the at least one processor, and instructions stored in the at least one memory. The instructions may be executable by the at least one processor to cause the apparatus to: transmit an NDPA frame associated with a UHR NDPA variant type, the NDPA frame including sounding information for communication devices that support UHR communications; transmit an NDP in accordance with the sounding information from the NDPA frame associated with the UHR NDPA variant type based on a capability of the second communication device to support UHR communications; and perform UHR communications with a first communication device according to the capability of the second communication device to support UHR communications using one or more communication parameters that are based on measurements of the NDP.

Another innovative aspect of the subject matter described in this disclosure can be implemented in a method for wireless communications at a second communication device. The method may include: transmitting an NDPA frame associated with a UHR NDPA variant type, the NDPA frame including sounding information for communication devices that support UHR communications; transmitting an NDP in accordance with the sounding information from the NDPA frame associated with the UHR NDPA variant type based on a capability of the second communication device to support UHR communications; and performing UHR communications with a first communication device according to the capability of the second communication device to support UHR communications using one or more communication parameters that are based on measurements of the NDP.

Another innovative aspect of the subject matter described in this disclosure can be implemented in an apparatus for wireless communications at a second communication device. The apparatus may include: means for transmitting an NDPA frame associated with a UHR NDPA variant type, the NDPA frame including sounding information for communication devices that support UHR communications; means for transmitting an NDP in accordance with the sounding information from the NDPA frame associated with the UHR NDPA variant type based on a capability of the second communication device to support UHR communications; and means for performing UHR communications with a first communication device according to the capability of the second communication device to support UHR communications using one or more communication parameters that are based on measurements of the NDP.

Another innovative aspect of the subject matter described in this disclosure can be implemented in a non-transitory computer-readable medium storing code for wireless communications at a second communication device. The code may include instructions executable by at least one processor to: transmit an NDPA frame associated with a UHR NDPA variant type, the NDPA frame including sounding information for communication devices that support UHR communications; transmit an NDP in accordance with the sounding information from the NDPA frame associated with the UHR NDPA variant type based on a capability of the second communication device to support UHR communications; and perform UHR communications with a first communication device according to the capability of the second communication device to support UHR communications using one or more communication parameters that are based on measurements of the NDP.

One innovative aspect of the subject matter described in this disclosure can be implemented in an apparatus for wireless communications at a second communication device. The apparatus may include at least one processor, at least one memory coupled with the at least one processor, and instructions stored in the at least one memory. The instructions may be executable by the at least one processor to cause the apparatus to: transmit a trigger frame that indicates an NDPA, a sounding mode for transmission of an NDP associated with the NDPA, and a set of parameters for transmission of a CBF associated with the NDP; transmit or receive the NDP associated with the NDPA in accordance with the sounding mode indicated by the trigger frame; and receive or transmit the CBF associated with the NDP in accordance with the set of parameters indicated by the trigger frame.

Another innovative aspect of the subject matter described in this disclosure can be implemented in a method for wireless communications at a second communication device. The method may include: transmitting a trigger frame that indicates an NDPA, a sounding mode for transmission of an NDP associated with the NDPA, and a set of parameters for transmission of a CBF associated with the NDP; transmitting or receiving the NDP associated with the NDPA in accordance with the sounding mode indicated by the trigger frame; and receiving or transmitting the CBF associated with the NDP in accordance with the set of parameters indicated by the trigger frame.

Another innovative aspect of the subject matter described in this disclosure can be implemented in an apparatus for wireless communications at a second communication device. The apparatus may include: means for transmitting a trigger frame that indicates an NDPA, a sounding mode for transmission of an NDP associated with the NDPA, and a set of parameters for transmission of a CBF associated with the NDP; means for transmitting or receiving the NDP associated with the NDPA in accordance with the sounding mode indicated by the trigger frame; and means for receiving or transmitting the CBF associated with the NDP in accordance with the set of parameters indicated by the trigger frame.

Another innovative aspect of the subject matter described in this disclosure can be implemented in a non-transitory computer-readable medium storing code for wireless communications at a second communication device. The code may include instructions executable by at least one processor to: transmit a trigger frame that indicates an NDPA, a sounding mode for transmission of an NDP associated with the NDPA, and a set of parameters for transmission of a CBF associated with the NDP; transmit or receive the NDP associated with the NDPA in accordance with the sounding mode indicated by the trigger frame; and receive or transmit the CBF associated with the NDP in accordance with the set of parameters indicated by the trigger frame.

Some examples of the methods, apparatuses, and non-transitory computer-readable media described herein may further include operations, features, means, or instructions for receiving respective UHR NDPs from one or more STAs in accordance with the NDPA indicated by the trigger frame, where the respective UHR NDPs include CBFs associated with the trigger frame, buffer status reports associated with the one or more STAs, or both.

Some examples of the methods, apparatuses, and non-transitory computer-readable media described herein may further include operations, features, means, or instructions for transmitting a second trigger frame that indicates transmit parameters for each of the one or more STAs, where the transmit parameters may be based on the buffer status reports in the respective UHR NDPs from the one or more STAs, channel status estimates derived from the respective UHR NDPs, or both.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 4 shows a hierarchical format of an example PPDU usable for communications between a wireless AP and one or more wireless STAs.

FIGS. 8A and 8B show examples of communication timelines that support sounding techniques for UHR communications.

FIGS. 9A and 9B show examples of communication timelines that support sounding techniques for UHR communications.

FIGS. 10A and 10B show examples of communication timelines that support sounding techniques for UHR communications.

FIGS. 17-20 show flowcharts illustrating example processes that support sounding techniques for UHR communications.

Like reference numbers and designations in the various drawings indicate like elements.

DETAILED DESCRIPTION

Figure 1:
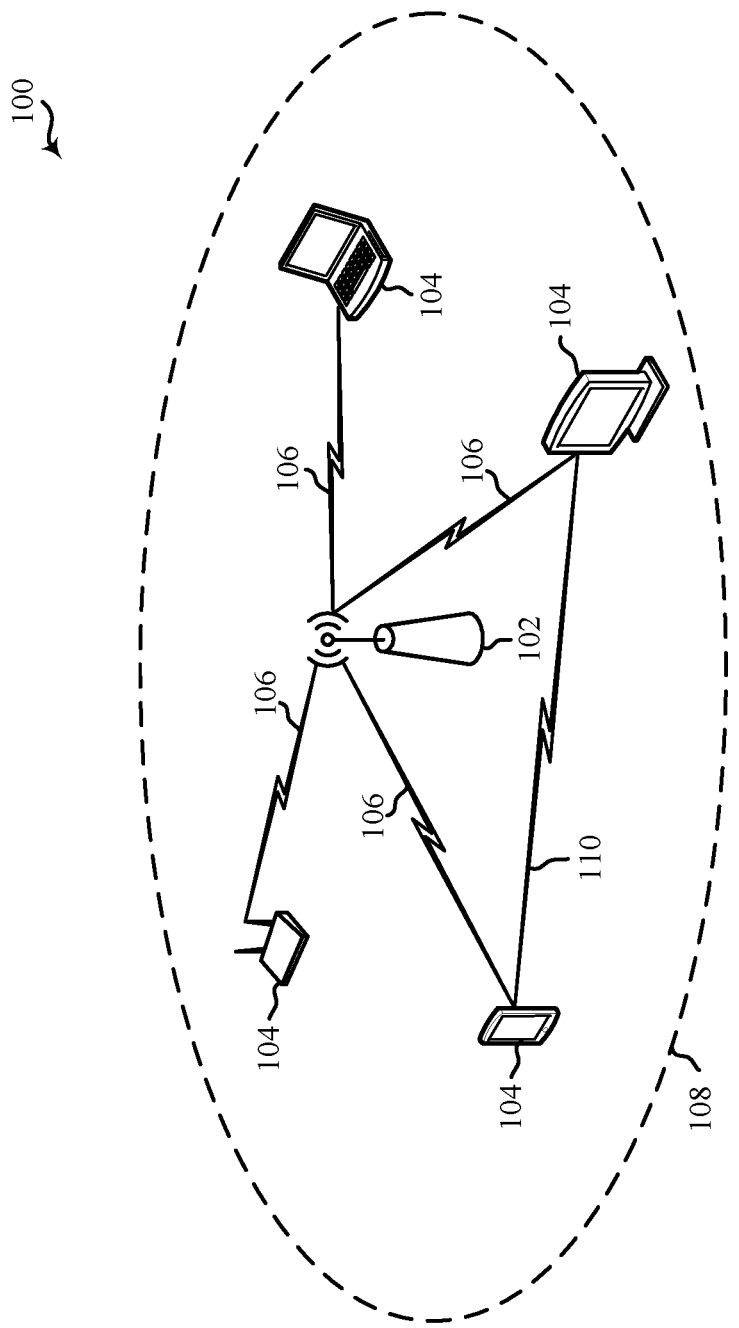
FIG. 1 shows a pictorial diagram of an example wireless local area network (WLAN).

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others.

The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

In some WLANs, a null data packet announcement (NDPA) frame may precede transmission of a null data packet (NDP). Upon receiving an NDPA frame from a wireless access point (AP), a wireless station (STA) may prepare to receive and measure an NDP from the AP. The STA may subsequently transmit a compressed beamforming frame (CBF) that includes a channel quality indicator (CQI), beamforming parameters, and other information derived from measurements of the NDP. In a non-trigger-based sounding mode, the STA may transmit the CBF using parameters indicated by the NDPA. In a trigger-based sounding mode, the STA may receive a beamforming report poll (BFRP) trigger frame that indicates which parameters to use for transmission of the CBF. In some implementations, an NDPA may be associated with a particular variant or type of signaling, such as a version of a signaling protocol or standard (e.g., a high efficiency (HE) variant, an extremely high throughout (EHT) variant, or a very high throughput (VHT) variant). The particular variant of an NDPA may be indicated by an NDPA variant field within the NDPA. However, the existing NDPA frame structure may support a limited quantity of NDPA variants.

Various aspects relate generally to increasing the quantity of NDPA variants that can be signaled between communication devices. Some aspects more specifically provide for an ultra-high reliability (UHR) NDPA frame variant and an NDPA trigger frame variant. In some implementations, to increase the quantity of NDPA variants that can be signaled, the length of the NDPA variant field in the UHR NDPA frame variant may be expanded from 2 bits to 4 bits, thereby enabling communication devices (such as a wireless AP) to indicate additional NDPA variants. Additionally, or alternatively, a reserved bit or a special association identifier (AID) in a STA Info field of the UHR NDPA frame variant can be used to indicate a specific NDPA variant (such as a UHR NDPA variant). In other implementations, a Trigger Type field of a Trigger frame can be set to a particular value to indicate that the trigger frame includes an NDPA (i.e., to indicate an NDPA trigger frame variant). A Common Info field in the trigger frame can be used to convey more information about the NDPA, such as a variant of the NDPA or a sounding mode associated with the NDPA. The NDPA trigger frame variant also may indicate parameters for transmission of a corresponding CBF from one or more of the responding STAs. Some of these parameters may pertain to UHR. For example, one or more of the parameters may indicate support for 480 megahertz (MHz) and/or 640 MHz bandwidth(s), distributed resource unit (RU) allocations for sounding, expanded RU allocation fields (which can cover up to 320 MHz or wider bandwidths), etc.

In some implementations, a new subtype value for the NDPA (e.g., type=Control, subtype=enhanced NDPA) may be used to indicate an enhanced NDPA (eNDPA), such as a UHR NDPA frame variant. The signaling that differentiates the eNDPA from other NDPs may located (i.e., provided) in the medium access control (MAC) header of the NDPA frame. In some implementations, the eNDPA may include signaling that indicates, to the beamformee(s), which physical layer protocol data unit (PPDU) type to use for transmission of the corresponding CBF, along with other parameters (such as the maximum MAC protocol data unit (MPDU) size).

Particular aspects of the subject matter described in this disclosure can be implemented to realize one or more of the following potential advantages. In some implementations, using a modified NDPA frame format that supports additional NDPA variants may improve the resiliency and efficiency of NDP-based sounding procedures, for example, by enabling communication devices to use UHR NDPs for trigger-based sounding and non-trigger-based sounding procedures. In some other implementations, using a trigger frame format to indicate an NDPA may reduce the signaling overhead of trigger-based sounding procedures, for example, by eliminating the need for a separate BFRP trigger frame. The NDPA trigger frame format described herein also may enable communication devices to use UHR PPDUs for sounding, which may further improve the signaling efficiency of sounding procedures. Additionally, or alternatively, some aspects may support wider bandwidths and more spatial streams (e.g., up to 16 spatial streams) for sounding, along with greater flexibility in selecting sounding modes, forward expansibility, etc.

FIG. 1 shows a pictorial diagram of an example WLAN 100. According to some aspects, the WLAN 100 can be an example of a Wi-Fi network. For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8). The WLAN 100 may include numerous wireless communication devices such as a wireless AP 102 and multiple wireless STAs 104. While only one AP 102 is shown in FIG. 1, the WLAN 100 also can include multiple APs 102. AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR, etc.) can be further improved by a small cell which is supported by an AP 102 serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other implementations. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IoT) devices, and vehicles, among other implementations. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a BSS identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHZ, 5 GHZ, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some implementations, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some implementations, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PPDUs. The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 5.9 GHZ and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4 GHz. 5 GHZ, or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz. 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

Figure 2:
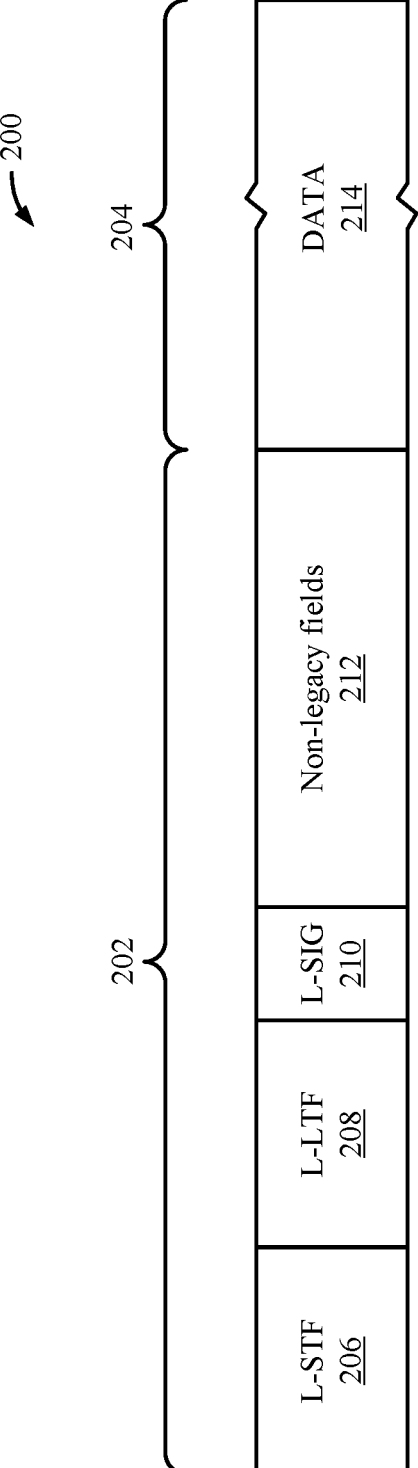
FIG. 2 shows an example protocol data unit (PDU) usable for communications between a wireless access point (AP) and one or more wireless stations (STAs).

FIG. 2 shows an example protocol data unit (PDU) 200 usable for wireless communication between a wireless AP 102 and one or more wireless STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel. The L-SIG 210 generally enables a receiving device to determine (for example, obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MPDUs or an aggregated MPDU (A-MPDU).

Figure 3:
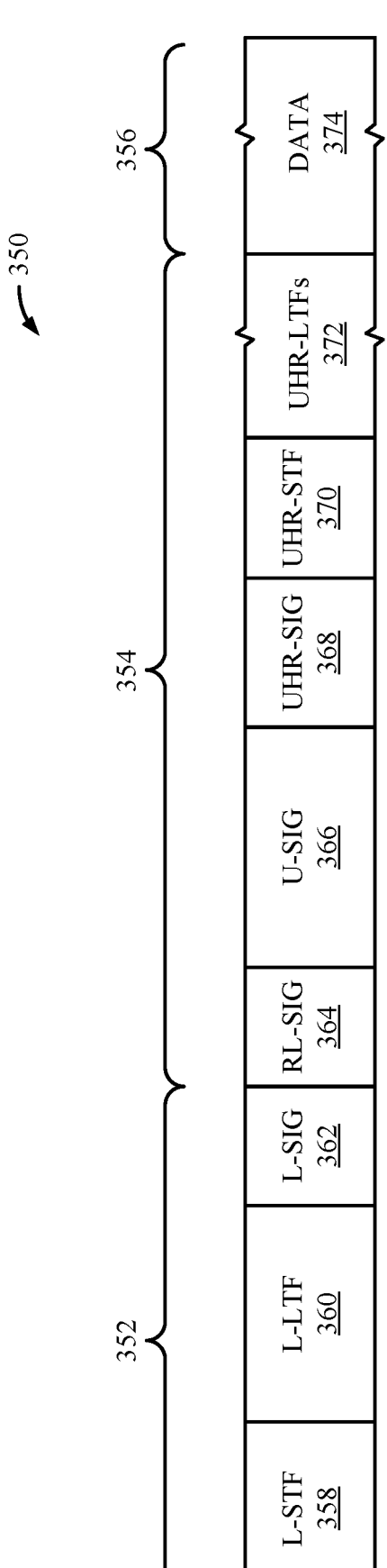
FIG. 3 shows an example physical layer (PHY) PDU (PPDU) usable for communications between a wireless AP and one or more wireless STAs.

FIG. 3 shows another example PPDU 350 usable for wireless communication between a wireless AP 102 and one or more wireless STAs 104. The PPDU 350 may be used for SU, OFDMA or MU-MIMO transmissions. The PPDU 350 may be formatted as an EHT WLAN PPDU in accordance with the IEEE 802.11be amendment to the IEEE 802.11 family of wireless communication protocol standards, or may be formatted as a PPDU conforming to any later (post-EHT) version of a new wireless communication protocol conforming to a future IEEE 802.11 wireless communication protocol standard, such as the 802.11 amendment associated with Wi-Fi 8), or another wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes a repetition of L-SIG (RL-SIG) 364 and multiple wireless communication protocol version-dependent signal fields after RL-SIG 364. For example, the non-legacy portion 354 may include a universal signal field (referred to herein as "U-SIG 366") and a UHR signal field (referred to herein as "UHR-SIG 368"). The presence of RL-SIG 364 and U-SIG 366 may indicate to UHR- or later version-compliant STAs 104 that the PPDU 350 is an EHT PPDU or a PPDU conforming to any later (post-EHT) version of a new wireless communication protocol conforming to a future IEEE 802.11 wireless communication protocol standard. One or both of U-SIG 366 and UHR-SIG 368 may be structured as, and carry version-dependent information for, other wireless communication protocol versions associated with amendments to the IEEE family of standards beyond UHR. For example, U-SIG 366 may be used by a receiving device to interpret bits in one or more of UHR-SIG 368 or the data field 374. Like L-STF 358, L-LTF 360, and L-SIG 362, the information in U-SIG 366 and UHR-SIG 368 may be duplicated and transmitted in each of the component 20 MHz channels in instances involving the use of a bonded channel.

The non-legacy portion 354 further includes an additional STF 370 (referred to herein as "UHR-STF 370," although it may be structured as, and carry version-dependent information for, other wireless communication protocol versions beyond UHR) and one or more additional LTFs 372 (referred to herein as "UHR-LTFs 372," although they may be structured as, and carry version-dependent information for, other wireless communication protocol versions beyond UHR). UHR-STF 370 may be used for timing and frequency tracking and AGC, and UHR-LTF 372 may be used for more refined channel estimation.

UHR-SIG 368 may be used by an AP 102 to identify and inform one or multiple STAs 104 that the AP 102 has scheduled UL or DL resources for them. UHR-SIG 368 may be decoded by each compatible STA 104 served by the AP 102. UHR-SIG 368 may generally be used by a receiving device to interpret bits in the data field 374. For example, UHR-SIG 368 may include RU allocation information, spatial stream configuration information, and per-user (for example, STA-specific) signaling information. Each UHR-SIG 368 may include a common field and at least one user-specific field. In the context of OFDMA, the common field can indicate RU distributions to multiple STAs 104, indicate the RU assignments in the frequency domain, indicate which RUs are allocated for MU-MIMO transmissions and which RUS correspond to OFDMA transmissions, and the quantity of users in allocations, among other implementations. The user-specific fields are assigned to particular STAs 104 and carry STA-specific scheduling information such as user-specific MCS values and user-specific RU allocation information. Such information enables the respective STAs 104 to identify and decode corresponding RUs in the associated data field 374.

In some wireless communications environments, EHT systems or other systems compliant with future generations of the IEEE 802.11 family of wireless communication protocol standards may provide additional capabilities over other previous systems (for example, HE systems or other legacy systems). EHT and newer wireless communication protocols may support flexible operating bandwidth enhancements at APs 102 and STAs 104, such as broadened operating bandwidths relative to legacy operating bandwidths or more granular operation relative to legacy operation. For example, an UHR system may allow communications spanning operating bandwidths of 20 MHz, 40 MHz, 80 MHz, 160 MHz, 240 MHz, 320 MHz, 480 MHz, 640 MHz, and 1280 MHz. EHT systems may support multiple bandwidth modes such as a contiguous 240 MHz bandwidth mode, a contiguous 320 MHz bandwidth mode, a noncontiguous 160+160 MHz bandwidth mode, or a noncontiguous 80+80+80+80 (or "4×80") MHz bandwidth mode.

In some implementations in which a wireless communication device operates in a contiguous 320 MHz bandwidth mode or a 160+160 MHz bandwidth mode. Signals for transmission may be generated by two different transmit chains of the device each having a bandwidth of 160 MHz (and each coupled to a different power amplifier). In some other implementations, signals for transmission may be generated by four or more different transmit chains of the device, each having a bandwidth of 80 MHz.

In some other implementations, the wireless communication device may operate in a contiguous 240 MHz bandwidth mode, or a noncontiguous 160+80 MHz bandwidth mode. In some implementations, the signals for transmission may be generated by three different transmit chains of the device, each having a bandwidth of 80 MHz. In some other implementations, the 240 MHz/160+80 MHz bandwidth modes also may be formed by puncturing 320/160+160 MHz bandwidth modes with one or more 80 MHz subchannels. For example, signals for transmission may be generated by two different transmit chains of the device each having a bandwidth of 160 MHz with one of the transmit chains outputting a signal having an 80 MHz subchannel punctured therein.

The operating bandwidth also may accommodate concurrent operation on other unlicensed frequency bands (such as the 6 GHz band) and a portion of spectrum that includes frequency bands traditionally used by Wi-Fi technology. In noncontiguous examples, the operating bandwidth may span one or more disparate sub-channel sets. For example, the 320 MHz bandwidth may be contiguous and located in the same 6 GHz band or noncontiguous and located in different bands (such as partly in the 5 GHz band and partly in the 6 GHz band).

In some implementations, operability enhancements associated with EHT and newer generations of the IEEE 802.11 family of wireless communication protocols, and in particular operation at an increased bandwidth, may include refinements to carrier sensing and signal reporting mechanisms. Such techniques may include modifications to existing rules, structure, or signaling implemented for legacy systems.

Figure 4:
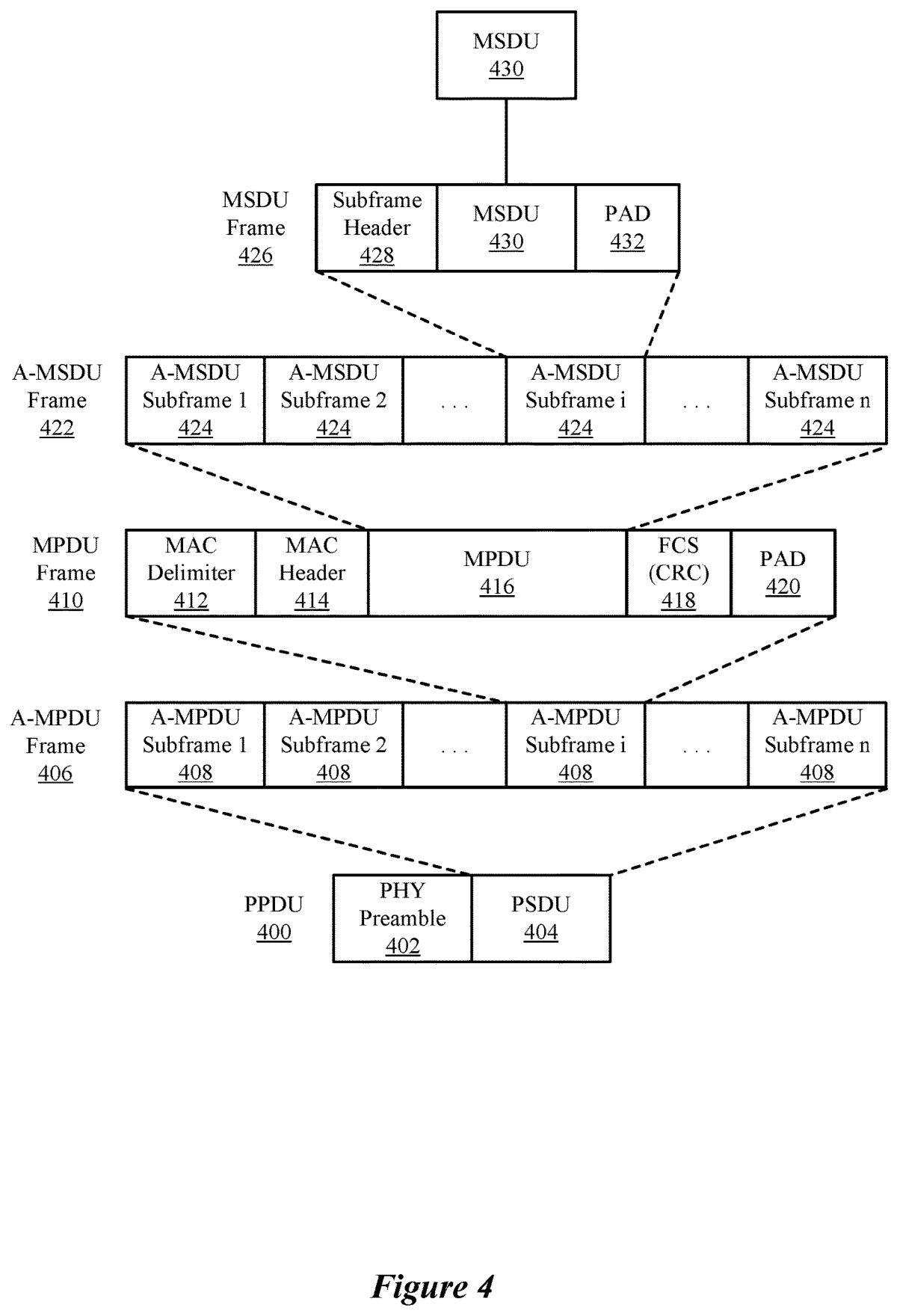

FIG. 4 shows a hierarchical format of an example PPDU usable for communications between a wireless AP 102 and one or more wireless STAs 104. As described, each PPDU 400 includes a PHY preamble 402 and a PSDU 404. Each PSDU 404 may represent (or "carry") one or more MAC PDUs (MPDUs) 416. For example, each PSDU 404 may carry an aggregated MPDU (A-MPDU) 406 that includes an aggregation of multiple A-MPDU subframes 408. Each A-MPDU subframe 406 may include an MPDU frame 410 that includes a MAC delimiter 412 and a MAC header 414 prior to the accompanying MPDU 416, which includes the data portion ("payload" or "frame body") of the MPDU frame 410. Each MPDU frame 410 also may include a frame check sequence (FCS) field 418 for error detection (for example, the FCS field may include a cyclic redundancy check (CRC)) and padding bits 420. The MPDU 416 may carry one or more MAC service data units (MSDUs) 426. For example, the MPDU 416 may carry an aggregated MSDU (A-MSDU) 422 including multiple A-MSDU subframes 424. Each A-MSDU subframe 424 contains a corresponding MSDU 430 preceded by a subframe header 428 and in some implementations followed by padding bits 432.

Referring back to the MPDU frame 410, the MAC delimiter 412 may serve as a marker of the start of the associated MPDU 416 and indicate the length of the associated MPDU 416. The MAC header 414 may include multiple fields containing information that defines or indicates characteristics or attributes of data encapsulated within the frame body. The MAC header 414 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 414 also includes one or more fields indicating addresses for the data encapsulated within the frame body. For example, the MAC header 414 may include a combination of a source address, a transmitter address, a receiver address, or a destination address. The MAC header 414 may further include a frame control field containing control information. The frame control field may specify a frame type, for example, a data frame, a control frame, or a management frame.

Some APs 102 and STAs 104 may implement spatial reuse techniques. For example, APs 102 and STAs 104 configured for communications using IEEE 802.11ax or 802.11be may be configured with a BSS color. APs 102 associated with different BSSs may be associated with different BSS colors. A BSS color is a numerical identifier of an AP's respective BSS (such as a 6 bit field carried by the SIG field). Each STA 104 may learn its own BSS color upon association with the respective AP 102. BSS color information is communicated at both the PHY and MAC sublayers. If an AP 102 or a STA 104 detects, obtains, selects, or identifies, a wireless packet from another wireless communication device while contending for access, the AP 102 or STA 104 may apply different contention parameters in accordance with whether the wireless packet is transmitted by, or transmitted to, another wireless communication device within its BSS or from a wireless communication device from an overlapping BSS (OBSS), as determined, identified, ascertained, or calculated by a BSS color indication in a preamble of the wireless packet. For example, if the BSS color associated with the wireless packet is the same as the BSS color of the AP 102 or STA 104, the AP 102 or STA 104 may use a first received signal strength indication (RSSI) detection threshold when performing a CCA on the wireless channel. However, if the BSS color associated with the wireless packet is different than the BSS color of the AP 102 or STA 104, the AP 102 or STA 104 may use a second RSSI detection threshold in lieu of using the first RSSI detection threshold when performing the CCA on the wireless channel, the second RSSI detection threshold being greater than the first RSSI detection threshold. In this way, the criteria for winning contention are relaxed when interfering transmissions are associated with an OBSS.

Some APs 102 and STAs 104 may implement techniques for spatial reuse that involve participation in a coordinated communication scheme. According to such techniques, an AP 102 may contend for access to a wireless medium to obtain control of the medium for a TXOP. The AP 102 that wins the contention (hereinafter also referred to as a "sharing AP") may select one or more other APs 102 (hereinafter also referred to as "shared APs") to share resources of the TXOP. The sharing and shared APs 102 may be located in proximity to one another such that at least some of their wireless coverage areas at least partially overlap. Some implementations may specifically involve coordinated AP TDMA or OFDMA techniques for sharing the time or frequency resources of a TXOP. To share its time or frequency resources, the sharing AP 102 may partition the TXOP into multiple time segments or frequency segments each including respective time or frequency resources representing a portion of the TXOP. The sharing AP 102 may allocate the time or frequency segments to itself or to one or more of the shared APs 102. For example, each shared AP 102 may utilize a partial TXOP assigned by the sharing AP 102 for its uplink or downlink communications with its associated STAs 104.

In some implementations of such TDMA techniques, each portion of a plurality of portions of the TXOP includes a set of time resources that do not overlap with any time resources of any other portion of the plurality of portions. In such examples, the scheduling information may include an indication of time resources, of multiple time resources of the TXOP, associated with each portion of the TXOP. For example, the scheduling information may include an indication of a time segment of the TXOP such as an indication of one or more slots or sets of symbol periods associated with each portion of the TXOP such as for multi-user TDMA.

In some other implementations of OFDMA techniques, each portion of the plurality of portions of the TXOP includes a set of frequency resources that do not overlap with any frequency resources of any other portion of the plurality of portions. In such implementations, the scheduling information may include an indication of frequency resources, of multiple frequency resources of the TXOP, associated with each portion of the TXOP. For example, the scheduling information may include an indication of a bandwidth portion of the wireless channel such as an indication of one or more subchannels or RUs associated with each portion of the TXOP such as for multi-user OFDMA.

In this manner, the sharing AP acquisition of the TXOP enables communication between one or more additional shared APs 102 and their respective BSSs, subject to appropriate power control and link adaptation. For example, the sharing AP 102 may limit the transmit powers of the selected shared APs 102 such that interference from the selected APs 102 does not prevent STAs 104 associated with the TXOP owner from successfully decoding packets transmitted by the sharing AP 102. Such techniques may be used to reduce latency because the other APs 102 may not need to wait to win contention for a TXOP to be able to transmit and receive data according to conventional CSMA/CA or EDCA techniques. Additionally, by enabling a group of APs 102 associated with different BSSs to participate in a coordinated AP transmission session, during which the group of APs 102 may share at least a portion of a single TXOP obtained by any one of the participating APs 102, such techniques may increase throughput across the BSSs associated with the participating APs 102 and also may achieve improvements in throughput fairness. Furthermore, with appropriate selection of the shared APs 102 and the scheduling of their respective time or frequency resources, medium utilization may be maximized or otherwise increased while packet loss resulting from OBSS interference is minimized or otherwise reduced. Various implementations may achieve these and other advantages without requiring that the sharing AP 102 or the shared APs 102 be aware of the STAs 104 associated with other BSSs, without requiring a preassigned or dedicated master AP 102 or preassigned groups of APs 102, and without requiring backhaul coordination between the APs 102 participating in the TXOP.

In some implementations in which the signal strengths or levels of interference associated with the selected APs 102 are relatively low (such as less than a given value), or when the decoding error rates of the selected APs 102 are relatively low (such as less than a threshold), the start times of the communications among the different BSSs may be synchronous. Conversely, when the signal strengths or levels of interference associated with the selected APs 102 are relatively high (such as greater than the given value), or when the decoding error rates of the selected APs 102 are relatively high (such as greater than the threshold), the start times may be offset from one another by a time period associated with decoding the preamble of a wireless packet and determining, from the decoded preamble, whether the wireless packet is an intra-BSS packet or is an OBSS packet. For example, the time period between the transmission of an intra-BSS packet and the transmission of an OBSS packet may allow a respective AP 102 (or its associated STAs 104) to decode the preamble of the wireless packet and obtain the BSS color value carried in the wireless packet to determine whether the wireless packet is an intra-BSS packet or an OBSS packet. In this manner, each of the participating APs 102 and their associated STAs 104 may be able to receive and decode intra-BSS packets in the presence of OBSS interference.

In some implementations, the sharing AP 102 may perform polling of a set of un-managed or non-co-managed APs 102 that support coordinated reuse to identify candidates for future spatial reuse opportunities. For example, the sharing AP 102 may transmit one or more spatial reuse poll frames as part of determining one or more spatial reuse criteria and selecting one or more other APs 102 to be shared APs 102. According to the polling, the sharing AP 102 may receive responses from one or more of the polled APs 102. In some specific examples, the sharing AP 102 may transmit a coordinated AP TXOP indication (CTI) frame to other APs 102 that indicates time and frequency of resources of the TXOP that can be shared. The sharing AP 102 may select one or more candidate APs 102 upon receiving a coordinated AP TXOP request (CTR) frame from a respective candidate AP 102 that indicates a desire by the respective AP 102 to participate in the TXOP. The poll responses or CTR frames may include a power indication, for example, an RX power or RSSI measured by the respective AP 102. In some other implementations, the sharing AP 102 may directly measure potential interference of a service supported (such as UL transmission) at one or more APs 102, and select the shared APs 102 based on the measured potential interference. The sharing AP 102 generally selects the APs 102 to participate in coordinated spatial reuse such that it still protects its own transmissions (which may be referred to as primary transmissions) to and from the STAs 104 in its BSS. The selected APs 102 may be allocated resources during the TXOP as described above.

APs 102 and STAs 104 that include multiple antennas may support various diversity schemes. For example, spatial diversity may be used by one or both of a transmitting device or a receiving device to increase the robustness of a transmission. For example, to implement a transmit diversity scheme, a transmitting device may transmit the same data redundantly over two or more antennas.

APs 102 and STAs 104 that include multiple antennas also may support space-time block coding (STBC). With STBC, a transmitting device also transmits multiple copies of a data stream across multiple antennas to exploit the various received versions of the data to increase the likelihood of decoding the correct data. More specifically, the data stream to be transmitted is encoded in blocks, which are distributed among the spaced antennas and across time. Generally, STBC can be used when the quantity $N_{Tx}$ of transmit antennas exceeds the quantity $N_{SS}$ of spatial streams. The $N_{SS}$ spatial streams may be mapped to a quantity $N_{STS}$ of space-time streams, which are mapped to $N_{Tx}$ transmit chains.

APs 102 and STAs 104 that include multiple antennas also may support spatial multiplexing, which may be used to increase the spectral efficiency and the resultant throughput of a transmission. To implement spatial multiplexing, the transmitting device divides the data stream into a quantity $N_{SS}$ of separate, independent spatial streams. The spatial streams are separately encoded and transmitted in parallel via the multiple $N_{Tx}$ transmit antennas. APs 102 and STAs 104 that include multiple antennas also may support beamforming. Beamforming generally refers to the steering of the energy of a transmission in the direction of a target receiver. Beamforming may be used both in a single-user (SU) context, for example, to improve a signal-to-noise ratio (SNR), as well as in a multi-user (MU) context, for example, to enable MU multiple-input multiple-output (MIMO) (MU-MIMO) transmissions (also referred to as spatial division multiple access (SDMA)). In the MU-MIMO context, beamforming may additionally, or alternatively, involve the nulling out of energy in the directions of other receiving devices. To perform SU beamforming or MU-MIMO, a transmitting device, referred to as the beamformer, transmits a signal from each of multiple antennas. The beamformer configures the amplitudes and phase shifts between the signals transmitted from the different antennas such that the signals add constructively along particular directions towards the intended receiver (referred to as the beamformee) or add destructively in other directions towards other devices to mitigate interference in a MU-MIMO context. The manner in which the beamformer configures the amplitudes and phase shifts depends on channel state information (CSI) associated with the wireless channels over which the beamformer intends to communicate with the beamformee.

To obtain the CSI necessary for beamforming, the beamformer may perform a channel sounding procedure with the beamformee. For example, the beamformer may transmit one or more sounding signals (for example, in the form of an NDP) to the beamformee. An NDP is a PPDU without any data field. The beamformee may perform measurements for each of the $N_{Tx} \times N_{Rx}$ sub-channels corresponding to all of the transmit antenna and receive antenna pairs associated with the sounding signal. The beamformee generates a feedback matrix associated with the channel measurements and, typically, compresses the feedback matrix before transmitting the feedback to the beamformer. The beamformer may generate a precoding (or "steering") matrix for the beamformee associated with the feedback and use the steering matrix to precode the data streams to configure the amplitudes and phase shifts for subsequent transmissions to the beamformee. The beamformer may use the steering matrix to determine (for example, identify, detect, ascertain, calculate, or compute) how to transmit a signal on each of its antennas to perform beamforming. For example, the steering matrix may be indicative of a phase shift, power level, etc. to use to transmit a respective signal on each of the beamformer's antennas.

A transmitting device may support the use of diversity schemes. When performing beamforming, the transmitting beamforming array gain is logarithmically proportional to the ratio of $N_{Tx}$ to $N_{SS}$. As such, it is generally desirable, within other constraints, to increase the quantity $N_{Tx}$ of transmit antennas when performing beamforming to increase the gain. It is also possible to more accurately direct transmissions or nulls by increasing the quantity of transmit antennas. This is especially advantageous in MU transmission contexts in which it is particularly important to reduce inter-user interference.

To increase spatial multiplexing capability, an AP 102 may support an increased quantity of spatial streams (such as up to 16 spatial streams). However, supporting additional spatial streams may result in increased CSI feedback overhead. Implicit CSI acquisition techniques may avoid CSI feedback overhead by taking advantage of the assumption that the UL and DL channels have reciprocal impulse responses (that is, that there is channel reciprocity). For examples, the CSI feedback overhead may be reduced using an implicit channel sounding procedure such as an implicit beamforming report (BFR) technique (such as where STAs 104 transmit NDP sounding packets in the UL while the AP 102 measures the channel) because no BFRs are sent. Once the AP 102 receives the NDPs, it may implicitly assess the channels for each of the STAs 104 and use the channel assessments to configure steering matrices. In order to mitigate hardware mismatches that could break the channel reciprocity on the UL and DL (such as the baseband-to-RF and RF-to-baseband chains not being reciprocal), the AP 102 may implement a calibration method to compensate for the mismatch between the UL and the DL channels. For example, the AP 102 may select a reference antenna, transmit a pilot signal from each of its antennas, and estimate baseband-to-RF gain for each of the non-reference antennas relative to the reference antenna.

In some implementations, multiple APs 102 may transmit to one or more STAs 104 at a time utilizing a distributed MU-MIMO scheme. Examples of such distributed MU-MIMO transmissions include coordinated beamforming (CBF) and joint transmission (JT). With CBF, signals (such as data streams) for a given STA 104 may be transmitted by only a single AP 102. However, the coverage areas of neighboring APs 102 may overlap, and signals transmitted by a given AP 102 may reach the STAs 104 in OBSSs associated with neighboring APs 102 as OBSS signals. CBF allows multiple neighboring APs 102 to transmit simultaneously while minimizing or avoiding interference, which may result in more opportunities for spatial reuse. More specifically, using CBF techniques, an AP 102 may beamform signals to in-BSS STAs 104 while forming nulls in the directions of STAs 104 in OBSSs such that any signals received at an OBSS STA 104 are of sufficiently low power to limit the interference at the STA 104. To accomplish this, an inter-BSS coordination set may be defined between the neighboring APs 102, which contains identifiers of all APs 102 and STAs 104 participating in CBF transmissions.

With JT, signals for a given STA 104 may be transmitted by multiple coordinated APs 102. For the multiple APs 102 to concurrently transmit data to a STA 104, the multiple APs 102 may all need a copy of the data to be transmitted to the STA 104. Accordingly, the APs 102 may need to exchange the data among each other for transmission to a STA 104. With JT, the combination of antennas of the multiple APs 102 transmitting to one or more STAs 104 may be considered as one large antenna array (which may be represented as a virtual antenna array) used for beamforming and transmitting signals. In combination with MU-MIMO techniques, the multiple antennas of the multiple APs 102 may be able to transmit data via multiple spatial streams. Accordingly, each STA 104 may receive data via one or more of the multiple spatial streams.

APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple RUs each including multiple frequency subcarriers (also referred to as "tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs also may be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP 102 also may designate one or more random access (RA) RUs for which unscheduled STAs 104 may contend.

Figures 5A, 5B:
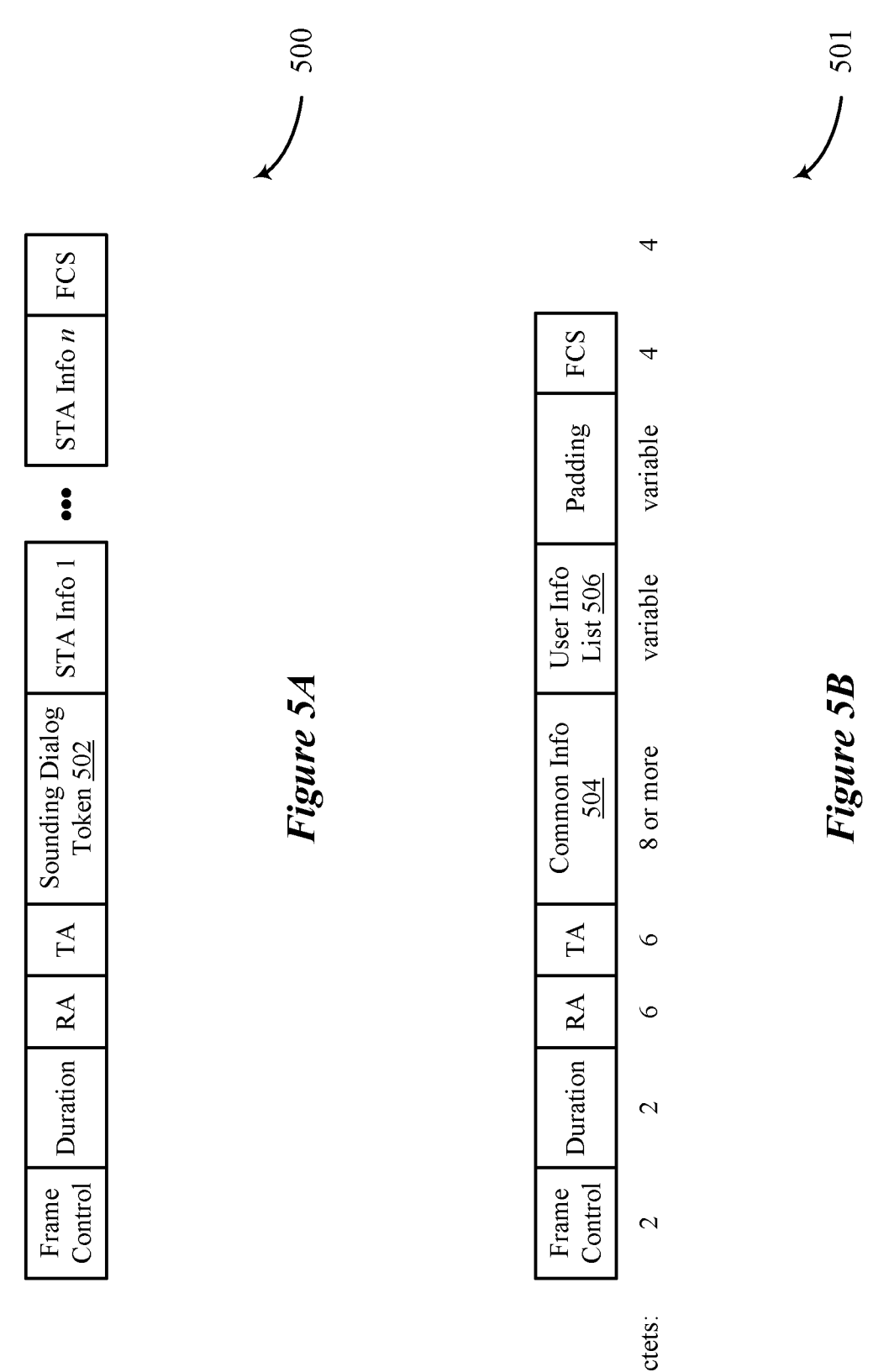
FIGS. 5A and 5B show examples of a null data packet announcement (NDPA) frame and a trigger frame usable for communications between a wireless AP and one or more wireless STAs.

FIGS. 5A and 5B show examples of an NDPA frame 500 and a trigger frame 501, respectively, that are usable for communications between a wireless AP and one or more wireless STAs. The NDPA frame 500 and the trigger frame 501 may implement or be implemented by aspects of the WLAN 100. For example, one or both of the NDPA frame 500 or the trigger frame 501 may be transmitted by a wireless AP, such as the wireless AP 102 described with reference to FIG. 1. The NDPA frame 500 includes a Frame Control field, a Duration field, an RA field, a TA field, a Sounding Dialog Token field 502, STA Info fields 1 through n (n being a positive integer), and an FCS field. The trigger frame 501 includes a Frame Control field, a Duration field, an RA field, a TA field, a Common Info field 504, a User Info List field 506, a Padding field, and an FCS field.

As described herein, some wireless networks may support different NDPA variants. For example, the NDPA frame 500 may have a HE/EHT NDPA variant frame format. The variant or type of the NDPA frame 500 may be identified by an NDPA Variant sub-field in the Sounding Dialog Token field 502. The NDPA Variant sub-field may have a length of 2 bits, and may support up to 4 different NDPA variants. However, when there are more NDPA Variants than can be signaled by the bits in the NDPA Variant sub-field, new or additional NDPA variants may not be supported. For example, if 2 bits of the NDPA Variant sub-field are currently in use to signal VHT, Ranging, HE, and EHT variants of NDPA, additional NDPA variants, such as a UHR variant, may not be supported.

A variant for 802.11bf (sensing) was introduced by classifying Sensing NDPAs as Ranging NDPAs and setting bit 31 (B31) to 1 in a STA Info field with AID equal to 2045. The techniques described herein, including with reference to FIG. 5A, may enable communication devices to signal additional NDPA variants, such as UHR NDPA variants. Some implementations of the subject matter described in this disclosure may incorporate aspects of existing NDPA frame formats. Some other implementations of the subject matter described in this disclosure may utilize different frame formats, such as an NDPA trigger frame format.

In the example of FIG. 5B, a Trigger Type sub-field of the trigger frame 501 may be set to indicate an NDPA. The Trigger Type sub-field may have a length of 4 bits, and may have at least 6 available (for example, unused) values. The Common Info field 504 may be updated to signal common parameters that are specific to the NDPA, such as an NDPA Variant sub-field of 2 or 3 bits, with one variant (e.g., the first variant) signaled by the NDPA Variant sub-field being a UHR variant. Additionally, or alternatively, the Common Info field 504 may include 2 or 3 bits that indicate a sounding mode, such as trigger-based, non-trigger-based, UL, joint, or multi-AP (MAP), among other implementations. The Common Info field 504 also may indicate other parameters that are relevant for sounding.

In some implementations, unused sub-fields of the Common Info field 504 (such as UL Spatial Reuse or UL HE SIG-A2) can be overloaded. Alternatively, these parameters can be added to a Trigger Dependent Common Info field. The Common Info field 504 also may indicate common trigger parameters to ensure that trigger-based sounding is performed correctly. These parameters may include UL Length, UL Bandwidth, Guard Interval (GI) And LTF Type, or AP Transmit Power, among other implementations. For non-trigger-based sounding, these fields can be omitted. Hence, the Common Info field 504 can be used to indicate the content of a single User Info field.

The User Info List field 506 of the trigger frame 501 may include one or more User Info fields, where the contents of the User Info fields are valid for trigger-based sounding. A Trigger Dependent User Info field may include per-user sounding parameters (namely, what information the STA Info fields of the NDPA are being used to convey, except for duplicate information). For non-trigger-based sounding, the contents of STA Info fields can be carried in the User Info fields or the Common Info field 504.

Figure 6:
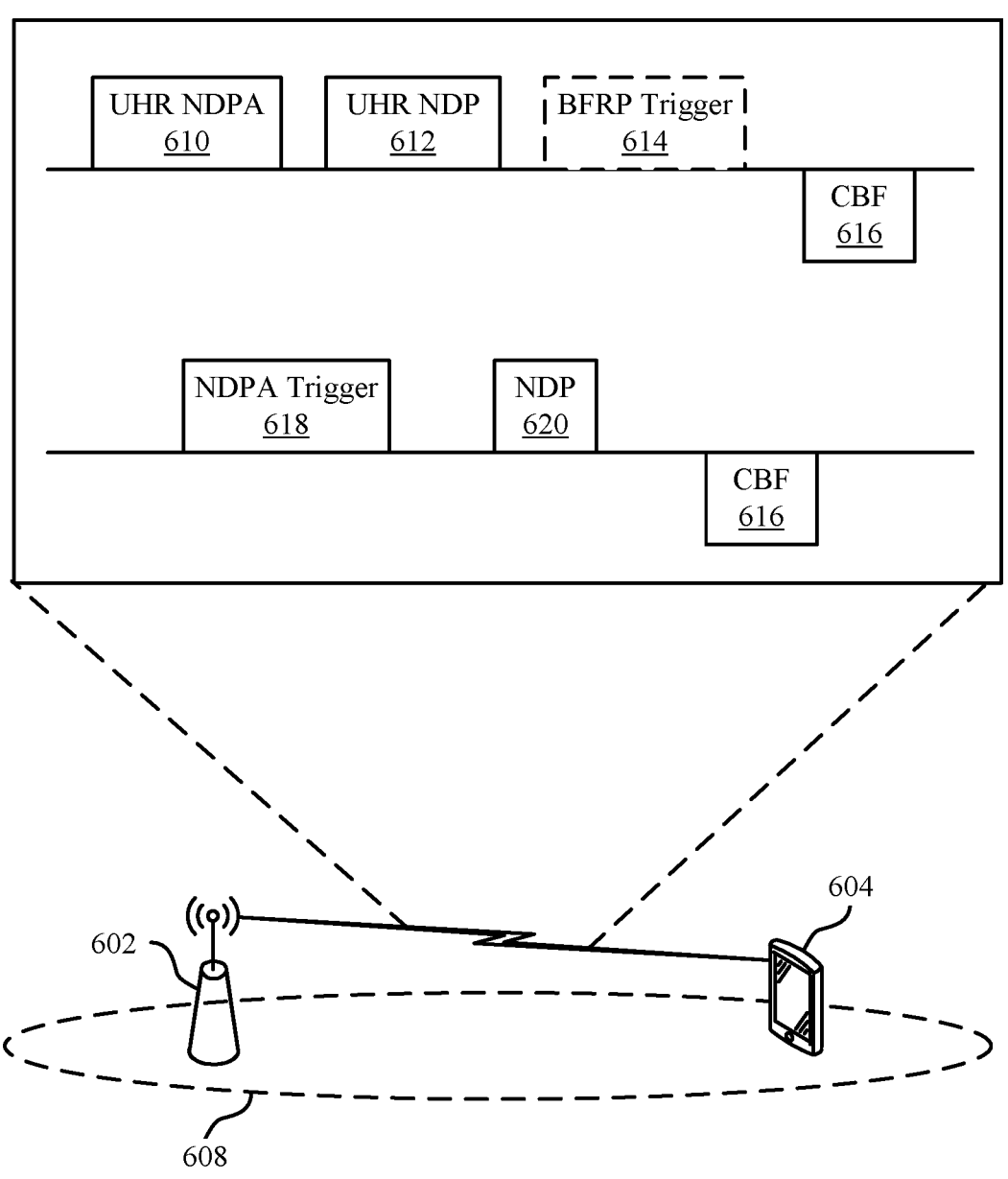
FIG. 6 shows an example of a signaling diagram that supports sounding techniques for ultra-high reliability (UHR) communications.

FIG. 6 shows an example of a signaling diagram 600 that supports sounding techniques for UHR communications. The signaling diagram 600 may implement or be implemented by aspects of the WLAN 100. For example, the signaling diagram 600 includes an AP 602, which may be an example of aspects of the AP 102 described with reference to FIG. 1. The signaling diagram 600 also includes a STA 604, which may be an example of one of the STAs 104 described with reference to FIG. 1. The STA 604 and the AP 602 may communicate within a coverage area 608 of the AP 602. The signaling diagram 600 illustrates an exemplary UHR NDPA frame-based sounding sequence and an exemplary NDPA trigger frame-based sounding sequence.

In some WLANs, an NDPA frame may precede transmission of an NDP. Upon receiving the NDPA frame from the AP 602, the STA 604 may prepare to receive and measure the NDP from the AP 602. The STA 604 may subsequently transmit a CBF that includes a CQI estimate, beamforming parameters, and other information derived from measurements of the NDP. In a non-trigger-based sounding mode, the STA 604 may transmit the CBF using parameters indicated by the NDPA. In a trigger-based sounding mode, the STA 604 may receive a BFRP trigger frame that indicates which parameters to use for transmission of the CBF. In some implementations, an NDPA may have a particular variant/type, such as HE, EHT, or VHT, among other implementations. The particular variant of an NDPA may be indicated by an NDPA variant field within the NDPA. However, the existing NDPA frame structure may support a limited quantity of NDPA variants.

Aspects of the signaling diagram 600 may support techniques for increasing the quantity of NDPA variants that can be signaled between the AP 602 and the STA 604. Some aspects more specifically provide for a UHR NDPA frame variant 610 and an NDPA trigger frame variant 618. In some implementations, to increase the quantity of NDPA variants that can be signaled, the length of the NDPA variant field in the UHR NDPA frame variant 610 may be expanded from 2 bits to 4 bits, thereby enabling communication devices to indicate additional NDPA variants. Additionally, or alternatively, a reserved bit or a special AID in a STA Info field of the UHR NDPA frame variant 610 can be used to indicate a specific NDPA variant (such as a UHR NDPA variant).

Upon receiving the UHR NDPA frame variant 610 from the AP 602, the STA 604 may monitor for a UHR NDP 612 using sounding parameters indicated by the UHR NDPA frame variant 610. Thereafter, the STA 604 may transmit a CBF 616 that indicates compressed beamforming information, CQI estimates, and/or other feedback information associated with the UHR NDP 612. In some implementations, the STA 604 may transmit the CBF 616 using parameters indicated by the UHR NDPA frame variant 610. In other implementations, the AP 602 may transmit a BFRP trigger frame 614 that instructs the STA 604 to use specific transmit parameters for the CBF 616. Alternatively, the STA 604 may select appropriate transmit parameters based on measurements of the UHR NDP 612.

In other implementations, the AP 602 may signal an NDPA to the STA 604 in the form of the NDPA trigger frame variant 618. A Trigger Type field of the NDPA trigger frame variant 618 can be set to a particular value to indicate the NDPA. A Common Info field in the NDPA trigger frame variant 618 can be used to convey more information about the corresponding NDPA, such as a variant of the NDPA or a sounding mode for the NDP 620. The NDPA trigger frame variant 618 also may indicate parameters for transmission of a CBF 616.

Aspects of the signaling diagram 600 can be implemented to realize one or more of the following potential advantages. In some implementations, using a modified NDPA frame format that supports additional NDPA variants may improve the resiliency and efficiency of NDP-based sounding procedures between the AP 602 and the STA 604, for example, by enabling the STA 604 to use the UHR NDP 612 for trigger-based sounding and non-trigger-based sounding procedures. In some other implementations, using the NDPA trigger frame variant 618 to indicate an NDPA may reduce the signaling overhead of trigger-based sounding procedures, for example, by eliminating the need for the BFRP trigger frame 614. The NDPA trigger frame variant 618 described herein also may enable communication devices (such as the STA 604) to use UHR PPDUs for sounding, which may further improve the signaling efficiency of sounding procedures between the STA 604 and the AP 602.

Figure 7:
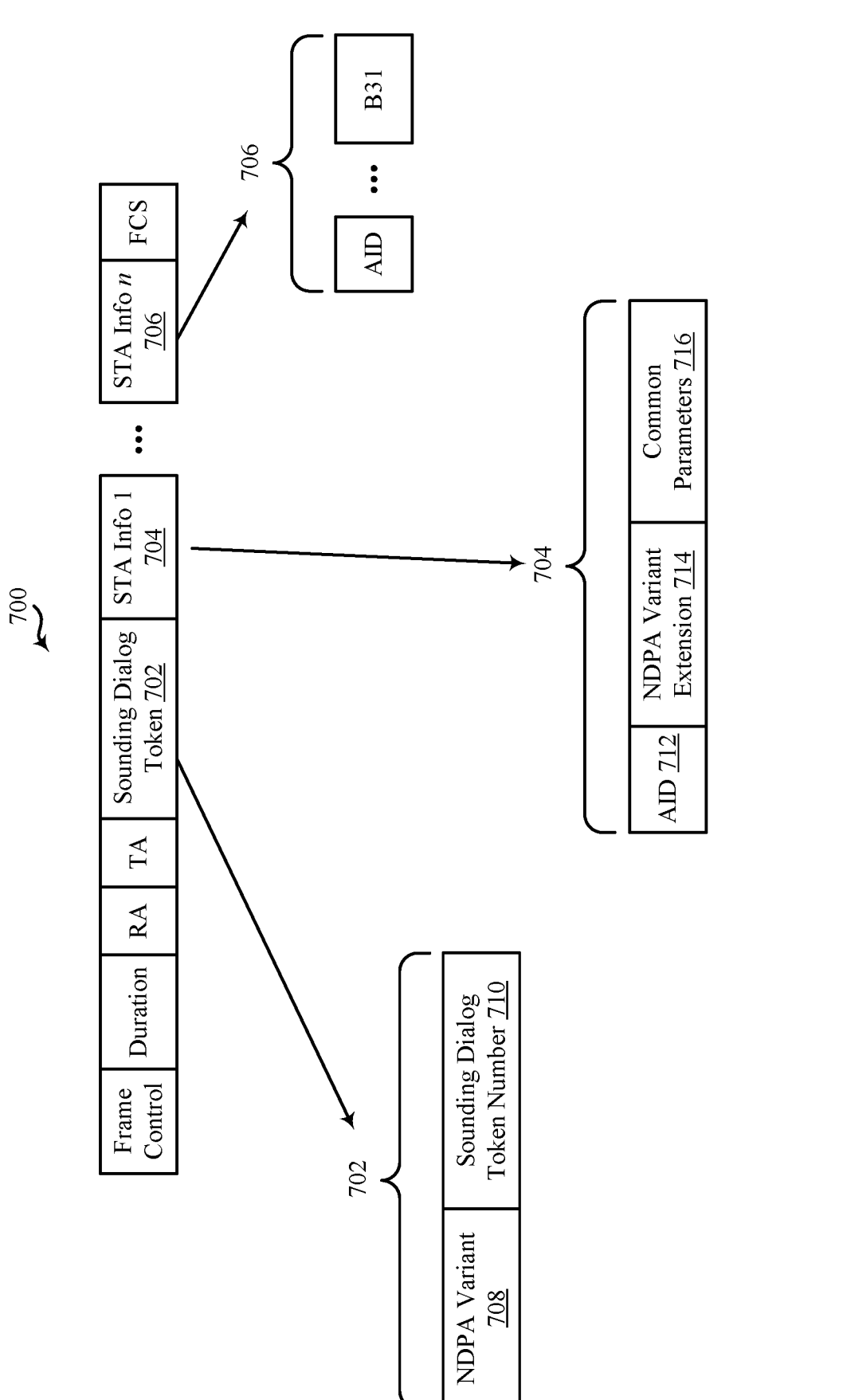
FIG. 7 shows an example of an NDPA frame that supports sounding techniques for UHR communications.

FIG. 7 shows an example of an NDPA frame 700 that supports sounding techniques for UHR communications. The NDPA frame 700 may be an example of other NDPA frames described herein, such as the NDPA frame 500 described with reference to FIG. 5A. The NDPA frame 700 may be transmitted by a communication device, such as the wireless AP 102 or one of the wireless STAs 104 described with reference to FIG. 1. The NDPA frame 700 includes a Frame Control field, a Duration field, an RA field, a TA field, a Sounding Dialog Token field 702, a STA Info field 704 (referred to hereinafter as STA Info field 1), a STA Info field 706 (referred to hereinafter as STA Info field n), and an FCS field.

As described herein, the NDPA frame 700 may precede transmission of an NDP. Upon receiving the NDPA frame 700 from a second communication device (such as a wireless AP), a first communication device (such as a wireless STA) may prepare to receive and measure the NDP from the second communication device. The first communication device may subsequently transmit a CBF that includes a CQI estimate, beamforming parameters, and other information derived from measurements of the NDP. In a non-trigger-based sounding mode, the first communication device may transmit the CBF using parameters indicated by the NDPA frame 700. In a trigger-based sounding mode, the first communication device may receive a BFRP trigger frame that indicates which parameters to use for transmission of the CBF. In some implementations, the NDPA frame 700 may have a particular variant/type (such as HE, EHT, or VHT). The particular variant of the NDPA frame 700 may be indicated by an NDPA variant sub-field 708 within the NDPA. However, the existing NDPA frame structure may support a limited quantity of NDPA variants.

Aspects of the present disclosure may support techniques for increasing the quantity of NDPA variants that can be signaled between communication devices. Some aspects more specifically provide for UHR NDPA frame variants (as shown in the example of FIG. 7) and NDPA trigger frame variants. In some implementations, to increase the quantity of NDPA variants that can be signaled, the length of the NDPA variant sub-field 708 in the NDPA frame 700 may be expanded from 2 bits to 4 bits, thereby enabling communication devices to indicate additional NDPA variants. Additionally, or alternatively, a reserved bit or a special AID 712 in the STA Info field 704 of the NDPA frame 700 can be used to indicate a specific NDPA variant (such as a UHR NDPA variant).

Upon receiving the NDPA frame 700 from the second communication device, the first communication device may monitor for an NDP using sounding parameters indicated by the NDPA frame 700. Thereafter, the first communication device may transmit a CBF that indicates compressed beamforming information, CQI estimates, and/or other feedback information associated with the NDP. In some implementations, the first communication device may transmit the CBF using parameters indicated by the NDPA frame 700 (such as the common parameters 716). In other implementations, the second communication device may transmit a BFPR trigger frame that instructs the first communication device to use specific transmit parameters for the CBF. Alternatively, the first communication device may select appropriate transmit parameters based on measurements of the NDP.

In other implementations, the second communication device may signal an NDPA using an NDPA trigger frame variant. A Trigger Type field of the NDPA trigger frame variant can be set to a particular value to indicate the NDPA. A Common Info field in the NDPA trigger frame variant can be used to convey more information about the corresponding NDPA, such as a variant of the NDPA or a sounding mode for the NDP. The NDPA trigger frame variant also may indicate parameters for transmission of a CBF.

The format of the NDPA frame 700 may be similar to a HE/EHT variant NDPA frame format. To support additional NDPA variants (such as a UHR variant), the variant space of the Sounding Dialog Token field 702 of the NDPA frame 700 may be expanded. For example, the NDPA variant sub-field 708 may be expanded from 2 bits to 4 bits (thereby increasing the quantity of available variants), and a Sounding Dialog Token Quantity sub-field 710 may be reduced from 6 bits to 4 bits. Additionally, or alternatively, a special STA Info field (such as STA Info field 1), possibly located first, can be used to indicate a particular NDPA variant. This special STA Info field can be interpreted as a Common Info field with a special AID 712 (such as 2045).

NDPA variants also may be referred to (or associated with) PHY versions/generations. In some implementations, an NDPA Variant Extension sub-field 714 (having a length of 2 or 3 bits) may be defined and used to indicate additional NDPA variants. Remaining bits in the special STA Info field can be used to indicate common parameters 716 for sounding sequences that apply to all beamformees. The remaining bits also can be used to differentiate between sounding modes, such as non-trigger-based, trigger-based, UL, joint, MAP, etc. In some other implementations, the NDPA frame 700 may differentiate STA Info fields for UHR STAs (for example, STAs that support UHR communications) and non-UHR STAs. For example, B31 of STA Info field n can be set to 1 to indicate a UHR NDPA variant.

Aspects of the subject matter described with reference to FIG. 7 can be implemented to realize one or more of the following potential advantages. In some implementations, using a modified NDPA frame format that supports additional NDPA variants may improve the resiliency and efficiency of NDP-based sounding procedures between communication devices, for example, by enabling a first communication device to use UHR NDPs for trigger-based sounding and non-trigger-based sounding procedures. In some other implementations, using an NDPA trigger frame variant to indicate an NDPA may reduce the signaling overhead of trigger-based sounding procedures, for example, by eliminating the need for a separate BFRP trigger frame. The NDPA trigger frame format described herein also may enable communication devices to use UHR PPDUs (as opposed to NDPs) for sounding, which may further improve the signaling efficiency of sounding procedures between communication devices.

FIGS. 8A and 8B show examples of a communication timeline 800 and a communication timeline 801, respectively, that support sounding techniques for UHR communications. The communication timeline 800 and the communication timeline 801 may implement or be implemented by aspects of the WLAN 100. For example, aspects of the communication timeline 800 and the communication timeline 801 may be performed by one or more of the STAs 104 or APs 102 described with reference to FIG. 1. The communication timeline 800 and the communication timeline 801 may illustrate NDPA-based sounding sequences that natively support non-trigger-based sounding (both AP and STA sides) and trigger-based sounding (AP side as beamformer). The trigger-based sounding sequence shown in the example of FIG. 8B may use a BFRP trigger frame 814 to initiate polling.

In the example of FIG. 8A, a second communication device (such as the AP 102 described with reference to FIG.

1) may transmit an NDPA 810-*a* after performing a backoff procedure. The NDPA 810-*a* may include a Frame Control field, a Duration field, an RA field, a TA field, a Sounding Dialog Token field, a first STA Info field, and an FCS field. Accordingly, the second communication device may transmit an NDP 812 using sounding parameters indicated by the NDPA 810-*a*. There may be a short interframe space (SIFS) between the NDPA 810-*a* and the NDP 812. After receiving the NDPA 810-*a* and the NDP 812 from the second communication device, a first communication device (such as the STA 604 described with reference to FIG. 6) may transmit a CBF 816 that includes compressed beamforming information and CQI estimates/calculations derived from the NDP 812. There may be another SIFS between the end of the NDP 812 and the start of the CBF 816.

In the example of FIG. 8B, the second communication device may transmit an NDPA 810-*b* after performing a backoff procedure. The NDPA 810-*b* may include a Frame Control field, a Duration field, an RA field, a TA field, a Sounding Dialog Token field, multiple STA Info fields (for example, n STA Info fields), and an FCS field. At least one of the STA Info fields may correspond to the first communication device. Accordingly, the second communication device may transmit an NDP 812 using sounding parameters indicated by the NDPA 810-*b*. There may be a SIFS between the NDPA 810-*b* and the NDP 812. After receiving the NDPA 810-*b* and the NDP 812 from the second communication device, a first communication device (such as the STA 604 described with reference to FIG. 6) may transmit a CBF 816 that include compressed beamforming information and CQI estimates/calculations derived from the NDP 812. The first communication device may transmit the CBF 816 and using parameters indicated by a BFRP trigger frame 814 and/or one of the STA Info fields from the NDPA 810-*b*. The second communication device also may receive a CBF 816 from a third communication device associated with another AID indicated by one of the STA Info fields of the NDPA 810-*b*.

Aspects of the subject matter described with reference to FIGS. 8A and 8B can be implemented to realize one or more of the following potential advantages. In some implementations, using a modified NDPA frame format that supports additional NDPA variants may improve the resiliency and efficiency of NDP-based sounding procedures between communication devices, for example, by enabling the first communication device to use UHR NDPs for trigger-based sounding and non-trigger-based sounding procedures. In some other implementations, using an NDPA trigger frame variant to indicate an NDPA may reduce the signaling overhead of trigger-based sounding procedures, for example, by eliminating the need for a separate BFRP trigger frame. The NDPA trigger frame format described herein also may enable communication devices to use UHR PPDUs (as opposed to NDPs) for sounding, which may further improve the signaling efficiency of sounding procedures between communication devices.

Figures 9A, 9B:
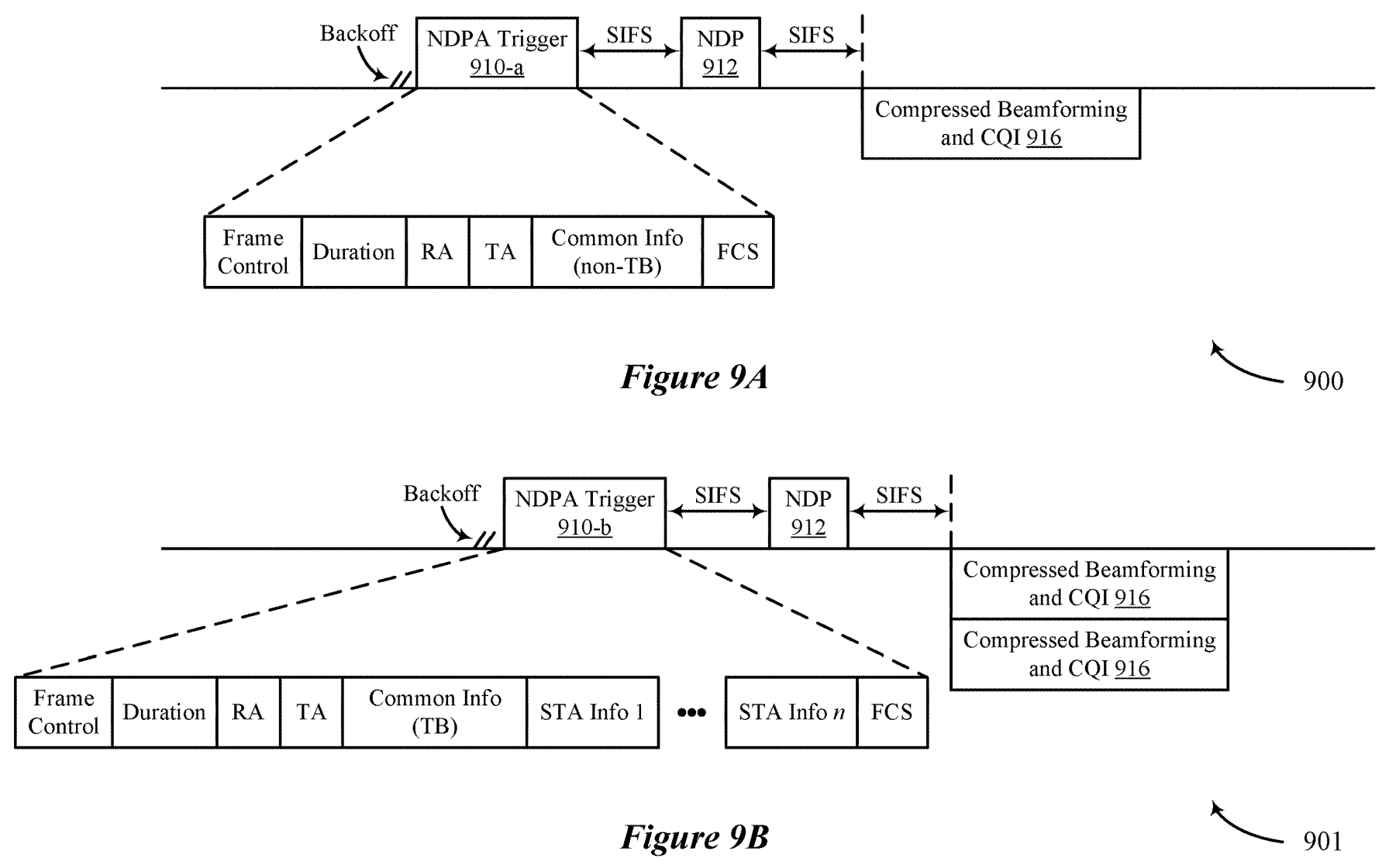

FIGS. 9A and 9B show examples of a communication timeline 900 and a communication timeline 901, respectively, that support sounding techniques for UHR communications. Aspects of the communication timeline 900 and the communication timeline 901 may implement or be implemented by aspects of the WLAN 100. For example, aspects of the communication timeline 900 and the communication timeline 901 may be implemented by one or more of the APs 102 or STAs 104 described with reference to FIG. 1. The communication timeline 900 and the communication timeline 901 may illustrate NDPA trigger frame-based sounding sequences. Specifically, the communication time-line 900 illustrates an example of a non-trigger-based sounding sequence, while the communication timeline 901 illustrates an example of a trigger-based sounding sequence.

In the example of FIG. 9A, a first communication device (such as the STA 604 described with reference to FIG. 6) may receive an NDPA trigger frame 910-*a* from a second communication device (such as the AP 102 described with reference to FIG. 1). The second communication device may transmit the NDPA trigger frame 910-*a* after performing a backoff procedure. The NDPA trigger frame 910-*a* may include a Frame Control field, a Duration field, an RA field, a TA field, a Common Info field (non-trigger-based), and an FCS field. Accordingly, the first communication device may receive an NDP 912 from the second communication device using one or more sounding parameters indicated by the NDPA trigger frame 910-*a*. As shown in the communication timeline 900, there may be a SIFS in between the NDPA trigger frame 910-*a* and the NDP 912. After receiving the NDP 912, the first communication device may transmit a CBF 916 that includes compressed beamforming information and/or a CQI estimate derived from measurements of the NDP 912. There may be another SIFS between the NDP 912 and the CBF 916.

In the example of FIG. 9B, the first communication device may receive an NDPA trigger frame 910-*b* from the second communication device. The second communication device may transmit the NDPA trigger frame 910-*b* after performing a backoff procedure. The NDPA trigger frame 910-*b* may include a Frame Control field, a Duration field, an RA field, a TA field, a Common Info field (trigger-based), multiple STA Info fields (for example, n STA Info fields), and an FCS field. Accordingly, the first communication device may receive an NDP 912 from the second communication device using one or more sounding parameters indicated by the NDPA trigger frame 910-*b*. As shown in the communication timeline 901, there may be a SIFS between the NDPA trigger frame 910-*b* and the NDP 912. After receiving the NDP 912, the second communication device may receive CBFs 916 that include compressed beamforming information and/or a CQI estimates derived from measurements of the NDP 912. The second communication device may receive the CBFs from communication devices with AIDs corresponding to those present in the STA Info fields of the NDPA trigger frame 910-*b*. There may be another SIFS between the NDP 912 and the CBFs 916.

Using NDPA Trigger frames may natively support and improve non-trigger-based sounding (both AP and STA sides), which can be also sequential. For example, in the communication timeline 900, the beamformee can select which parameters to use for CBF transmission, although the beamformer can control the UL PPDU duration via a UL Length field of the NDPA trigger frame 910-*a*, thereby providing greater TXOP duration reliability. NDPA trigger frames also may natively support trigger-based sounding (both AP and STA sides). For example, in the communication timeline 901, the beamformer can use the NDPA trigger frame 910-*b* to specify which parameters the beamformee(s) are expected to use for transmission of CBF(s), thereby eliminating the need for a BFRP trigger frame, since the NDPA trigger frame 910-*a* indicates the same information.

In some implementations, a UHR PPDU can be defined such that a bit in SIG-A indicates that the UHR PPDU can be used for sounding (similar to an NDP). BSS Color, UL Flag and other fields in SIG-A and SIG-B also can be used to reduce the quantity of beamformees. The UHR PPDU can be used to convey the NDPA Trigger frame (for example, a duplicate UHR PPDU). As such, separate NDP sounding PPDUs may not be needed, which could provide the beamformee with additional processing time.

Aspects of the subject matter described with reference to FIGS. 9A and 9B can be implemented to realize one or more of the following potential advantages. In some implementations, using a modified NDPA frame format that supports additional NDPA variants may improve the resiliency and efficiency of NDP-based sounding procedures between communication devices, for example, by enabling communication devices to use UHR NDPs for trigger-based sounding and non-trigger-based sounding procedures. In some other implementations, using an NDPA trigger frame variant to indicate an NDPA may reduce the signaling overhead of trigger-based sounding procedures, for example, by eliminating the need for a separate BFRP trigger frame. The NDPA trigger frame format described herein also may enable communication devices to use UHR PPDUs (as opposed to NDPs) for sounding, which may further improve the signaling efficiency of sounding procedures between communication devices.

Figures 10A, 10B:
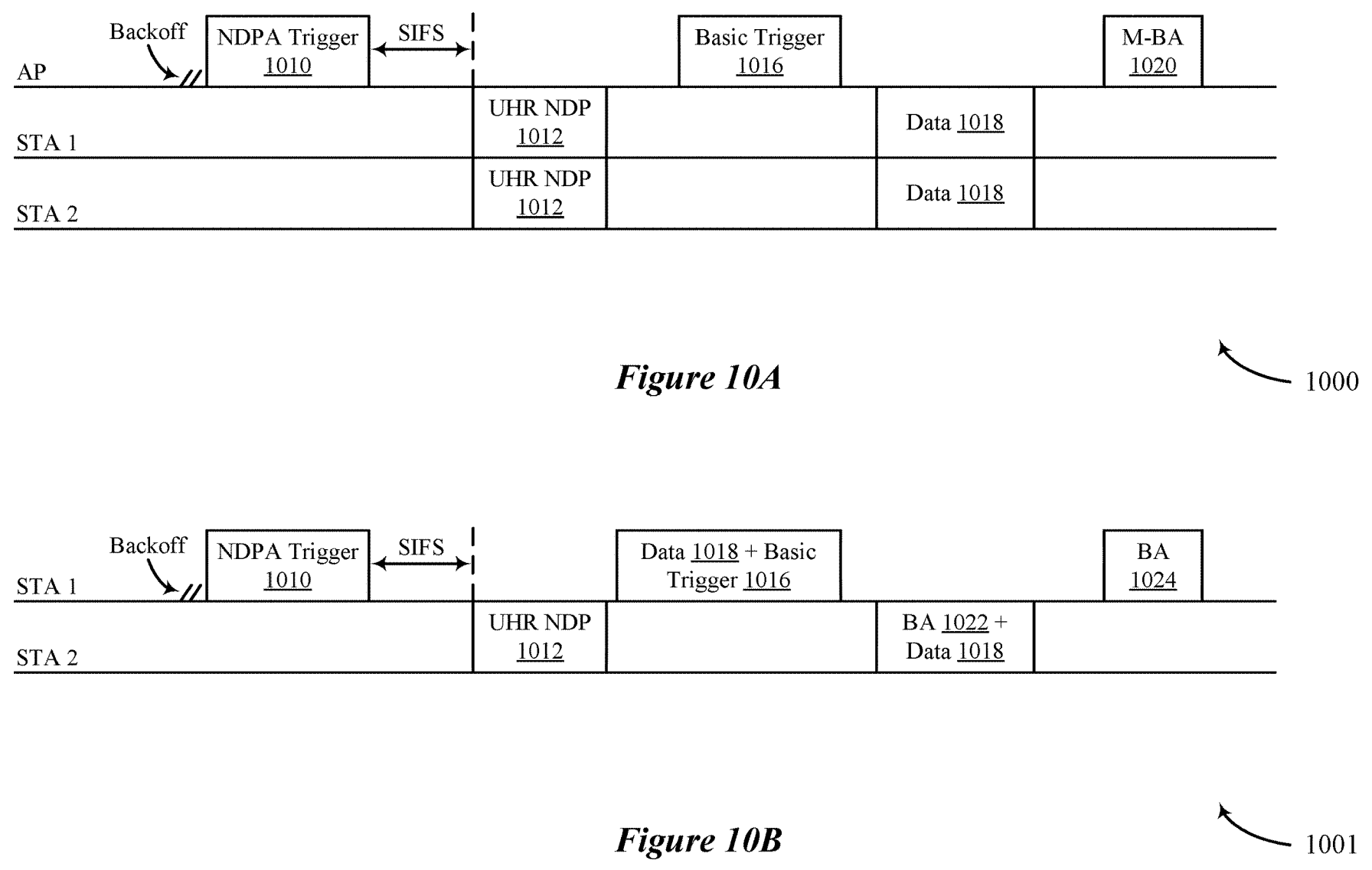

FIGS. 10A and 10B show examples of a communication timeline 1000 and a communication timeline 1001, respectively, that support sounding techniques for UHR communications. The communication timeline 1000 and the communication timeline 1001 may implement or be implemented by aspects of the WLAN 100. For example, the communication timeline 1000 and the communication timeline 1001 may be implemented by one or more of the APs 102 or STAs 104 described with reference to FIG. 1. The communication timeline 1000 and the communication timeline 1001 illustrate examples of sounding sequences within a BSS. Specifically, the communication timeline 1000 illustrates an example of a trigger-based sounding sequence for UL MU sounding, while the communication timeline 1001 illustrates an example of a trigger-based sounding sequence for SU sounding.

As described herein, a first communication device (such as a wireless STA 104 described with reference to FIG. 1) may receive an NDPA frame associated with a UHR NDPA variant type, the NDPA frame including sounding information for communication devices that support UHR communications. The first communication device may receive an NDP in accordance with the sounding information from the NDPA frame associated with the UHR NDPA variant type based on a capability of the first communication device to support UHR communications. Accordingly, the first communication device may perform UHR communications with a second communication device (such as the AP 102 described with reference to FIG. 1) according to the capability of the first communication device to support UHR communications using one or more communication parameters that are based on measurements of the NDP.

Additionally, or alternatively, the first communication device may receive a trigger frame (such as the NDPA trigger frame variant 618 described with reference to FIG. 6) that indicates an NDPA, a sounding mode (for example, trigger-based, non-trigger-based, MAP, UL, joint) for transmission of an NDP associated with the NDPA, and a set of parameters for transmission of a CBF associated with the NDP (such as the CBFs 916 described with reference to FIG. 9B). Thereafter, the first communication device may receive or transmit the NDP associated with the NDPA in accordance with the sounding mode indicated by the trigger frame. Accordingly, the first communication device may transmit or receive the CBF associated with the NDP in accordance with the set of parameters indicated by the trigger frame.

In the example of FIG. 10A, an AP may solicit (for example, request) UHR NDPs 1012 from one or more STAs using an NDPA trigger frame 1010. The AP may transmit the NDPA trigger frame 1010 after performing a backoff. There may be a SIFS between the NDPA trigger frame 1010 and the UHR NDPs 1012. In some implementations, the UHR NDPs 1012 may aggregate basic CBFs that are computed using the NDPA trigger frame 1010, possibly with current buffer status reports. MPDUs and HTC (possibly control) can be used as an alternative for NDPs. In the communication timeline 900, the AP may send a Basic Trigger frame 1016 with transmit parameters for each STA, accounting for buffer status reports received from each STA. If a STA reports 0, the STA may not be polled. Channel status estimates may be based on received sounding NDPs. The Basic Trigger frame 1016 may solicit (for example, request) data 1018 from the STAs. After receiving the data 1018, the AP may transmit a multi-BA (M-BA) 1020 that includes feedback for each of the STAs.

In the example of FIG. 10B, STA 1 may solicit a UHR NDP 1012 from a peer STA 2 using a NDPA trigger frame 1010. STA 1 may transmit the NDPA trigger frame 1010 after performing a backoff. There may be a SIFS between the NDPA trigger frame 1010 and the UHR NDP 1012. In some implementations, the UHR NDP 1012 may contain a buffer status report and possibly a CBF from STA 2. Pending data can be sent using the transmit parameters computed from the reported CBFs. In some implementations, a Basic Trigger frame 1016 can be aggregated with data 1018 to solicit data 1018 pending at STA 2. As described herein, STA 2 can use transmit parameters that account for channel status estimates based on received sounding NDP(s). STA 2 may transmit a BA 1022 for the data 1018 from STA 1, along with the pending data 1018 solicited by the Basic Trigger frame 1016. Accordingly, STA 1 may transmit a BA 1024 for the data 1018 received from STA 2.

Aspects of the subject matter described with reference to FIGS. 10A and 10B can be implemented to realize one or more of the following potential advantages. In some implementations, using a modified NDPA frame format that supports additional NDPA variants may improve the resiliency and efficiency of NDP-based sounding procedures between communication devices, for example, by enabling communication devices to use UHR NDPs for trigger-based sounding and non-trigger-based sounding procedures. In some other implementations, using an NDPA trigger frame variant to indicate an NDPA may reduce the signaling overhead of trigger-based sounding procedures, for example, by eliminating the need for a separate BFRP trigger frame. The NDPA trigger frame format described herein also may enable communication devices to use UHR PPDUs (as opposed to NDPs) for sounding, which may further improve the signaling efficiency of sounding procedures between communication devices.

Figures 11A, 11B:
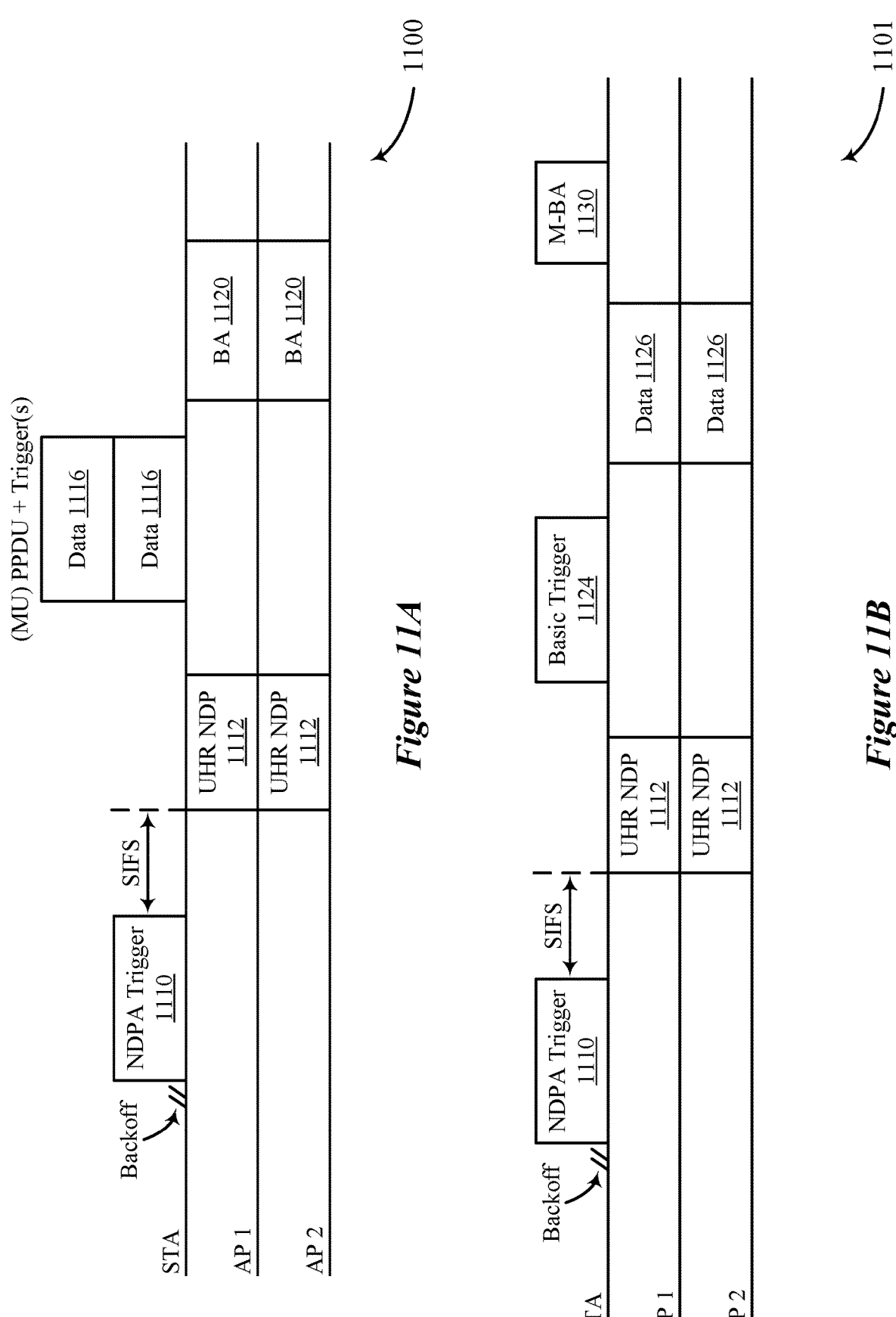
FIGS. 11A and 11B show examples of communication timelines that support sounding techniques for UHR communications.

FIGS. 11A and 11B show examples of a communication timeline 1100 and a communication timeline 1101, respectively, that support sounding techniques for UHR communications. The communication timeline 1100 and the communication timeline 1101 may implement or be implemented by aspects of the WLAN 100. For example, the communication timeline 1100 and the communication timeline 1101 may be implemented by one or more of the APs 102 or STAs 104 described with reference to FIG. 1. The communication timeline 1100 and the communication timeline 1101 may illustrate examples of sounding sequences for MAP deployments. Specifically, the communication timeline 1100 illustrates an example of a trigger-based sounding sequence for UL MAP sounding, while the communication timeline 1101 illustrates an example of a trigger-based sounding sequence for downlink MAP sounding.

As described herein, a first communication device (such as a wireless STA 104 described with reference to FIG. 1) may receive an NDPA frame associated with a UHR NDPA variant type, the NDPA frame including sounding information for communication devices that support UHR communications. The first communication device may receive an NDP in accordance with the sounding information from the NDPA frame associated with the UHR NDPA variant type based on a capability of the first communication device to support UHR communications. Accordingly, the first communication device may perform UHR communications with a second communication device (such as the AP 102 described with reference to FIG. 1) according to the capability of the first communication device to support UHR communications using one or more communication parameters that are based on measurements of the NDP.

Additionally, or alternatively, the first communication device may receive a trigger frame (such as the NDPA trigger frame variant 618 described with reference to FIG. 6) that indicates an NDPA, a sounding mode (for example, trigger-based, non-trigger-based, MAP, UL, joint) for transmission of an NDP associated with the NDPA, and a set of parameters for transmission of a CBF associated with the NDP (such as the CBFs 916 described with reference to FIG. 9B). Thereafter, the first communication device may receive or transmit the NDP associated with the NDPA in accordance with the sounding mode indicated by the trigger frame. Accordingly, the first communication device may transmit or receive the CBF associated with the NDP in accordance with the set of parameters indicated by the trigger frame.

In the example of FIG. 11A, if a STA has pending uplink data to send, the STA can sound one or more APs using an NDPA trigger frame 1110. The STA may transmit the NDPA trigger frame 1110 after performing a backoff. The one or more APs may transmit UHR NDPs 1112 back to the STA using sounding parameters indicated by the NDPA trigger frame 1110. There may be a SIFS between the UHR NDPs 1112 and the NDPA trigger frame 1110. After receiving the UHR NDPs 1112, the STA may select the best AP (for example, the AP with the most favorable connection quality) or a set of APs, and may send uplink data 1116 (such as a MU PPDU) to the selected APs. In some implementations, the uplink data 1116 may be aggregated with a basic trigger frame. Accordingly, the selected APs may transmit BAs 1120 for the uplink data 1116.

In the example of FIG. 11B, if a STA in a power saving mode determines that AP 1 and AP 2 have pending downlink data, the STA can sound these APs using an NDPA trigger frame 1110. STAs in a power saving mode may read (for example, decode) a beacon frame to determine pending downlink data availability from a traffic indication map (TIM) element. In some implementations, the STA may sound AP 1 and AP 2 implicitly, based on a Beacon frame or other similar frames. Accordingly, the STA may send a Basic Trigger frame 1124 addressed to one or more of the APs to solicit downlink data 1126 from the APs. Alternatively, the STA can send CBFs to the APs so the APs can calculate/ select appropriate transmit parameters, in which case downlink data 1126 may be sent sequentially by each AP (or using FDMA). Thereafter, the STA may transmit an M-BA 1130 for the downlink data 1126.

Aspects of the subject matter described with reference to FIGS. 11A and 11B can be implemented to realize one or more of the following potential advantages. In some implementations, using a modified NDPA frame format that supports additional NDPA variants may improve the resiliency and efficiency of NDP-based sounding procedures between communication devices, for example, by enabling communication devices to use UHR NDPs for trigger-based sounding and non-trigger-based sounding procedures. In some other implementations, using an NDPA trigger frame variant to indicate an NDPA may reduce the signaling overhead of trigger-based sounding procedures, for example, by eliminating the need for a separate BFRP trigger frame. The NDPA trigger frame format described herein also may enable communication devices to use UHR PPDUs (as opposed to NDPs) for sounding, which may further improve the signaling efficiency of sounding procedures between communication devices.

Figures 12A, 12B:
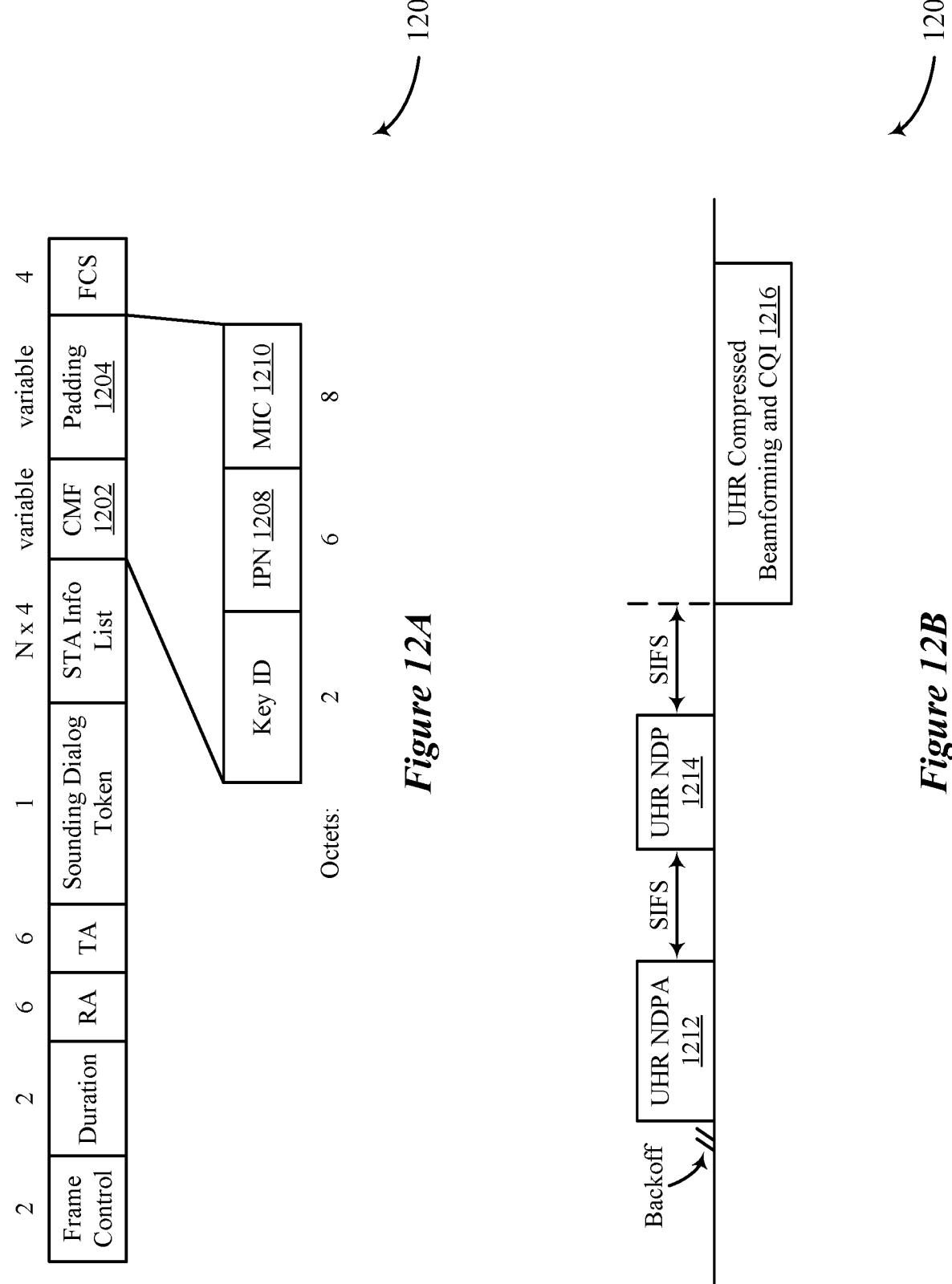
FIGS. 12A and 12B show examples of an NDPA frame and a communication timeline that support sounding techniques for UHR communications.

FIGS. 12A and 12B show examples of an NDPA frame 1200 and a communication timeline 1201, respectively, that support sounding techniques for UHR communications. The NDPA frame 1200 and the communication timeline 1201 may implement or be implemented by aspects of the WLAN 100. For example, the communication timeline 1201 may be implemented by one or more of the APs 102 or STAs 104 described with reference to FIG. 1. The NDPA frame 1200 may be an example of the NDPA frame 500, the NDPA frame 700, or both, as described with reference to FIGS. 5A and 7, respectively.

As described herein, a first communication device (such as a wireless STA 104 described with reference to FIG. 1) may receive an NDPA frame associated with a UHR NDPA variant type, the NDPA frame including sounding information for communication devices that support UHR communications. The first communication device may receive an NDP in accordance with the sounding information from the NDPA frame associated with the UHR NDPA variant type based on a capability of the first communication device to support UHR communications. Accordingly, the first communication device may perform UHR communications with a second communication device (such as the AP 102 described with reference to FIG. 1) according to the capability of the first communication device to support UHR communications using one or more communication parameters that are based on measurements of the NDP.

Additionally, or alternatively, the first communication device may receive a trigger frame (such as the NDPA trigger frame variant 618 described with reference to FIG. 6) that indicates an NDPA, a sounding mode (for example, trigger-based, non-trigger-based, MAP, UL, joint) for transmission of an NDP associated with the NDPA, and a set of parameters for transmission of a CBF associated with the NDP (such as the CBF 916 described with reference to FIG. 9A). Thereafter, the first communication device may receive or transmit the NDP associated with the NDPA in accordance with the sounding mode indicated by the trigger frame. Accordingly, the first communication device may transmit or receive the CBF associated with the NDP in accordance with the set of parameters indicated by the trigger frame.

In the example of FIG. 12A, a CMF field 1202 may be added to the NDPA frame 1200 to provide NDPA frame protection. A message integrity check (MIC) 1210 may be calculated over the NDPA frame body, including the Sounding Dialog Token and STA Info List fields. The CMF field 1202 may be applicable to STAs that support UHR communications. Other STAs (such as HE/EHT STAs) can ignore/discard the CMF field 1202, but keep processing the NDPA frame 1200. The MIC 1210 may be included in the CMF field 1202, and may follow the useful STA Info List field. Cipher-based message authentication codes (CMAC) or Galois Message Authentication codes (GMAC) can be used for MIC calculation, and an integrity group key (IGTK) may be used to compute MIC. An integrity packet number (IPN) 1208 may be used for NDPA frame replay protection. Padding 1204 can be attained by appending STA Info fields for other STAs. UHR STAs can discard a received NDPA frame if there is a MIC mismatch. In such cases, there is no need for the STA to compute/generate sounding feedback, thereby resulting in power/resource savings.

In the example of FIG. 12B, a first communication device (such as the STA 604 described with reference to FIG. 6) may receive a UHR NDPA frame 1212 from a second communication device (such as the AP 102 described with reference to FIG. 1). The UHR NDPA frame 1212 may include sounding information for communication devices that support UHR communications. The first communication device may receive a UHR NDP 1214 in accordance with the sounding information from the UHR NDPA frame 1212 based on a capability of the first communication device to support UHR communications. Accordingly, the first communication device may perform transmit a UHR CBF 1216 using transmit parameters indicated by the UHR NDPA frame 1212 or selected by the first communication device. The UHR CBF 1216, which may be an example of an action frame, can be included in a protected MGMT frame, thereby preventing attackers from sending misleading or inaccurate CBFs to the beamformer.

Aspects of the subject matter described with reference to FIGS. 12A and 12B can be implemented to realize one or more of the following potential advantages. In some implementations, using a modified NDPA frame format that supports additional NDPA variants may improve the resiliency and efficiency of NDP-based sounding procedures between communication devices, for example, by enabling communication devices to use UHR NDPs for trigger-based sounding and non-trigger-based sounding procedures. In some other implementations, using an NDPA trigger frame variant to indicate an NDPA may reduce the signaling overhead of trigger-based sounding procedures, for example, by eliminating the need for a separate BFRP trigger frame. The NDPA trigger frame format described herein also may enable communication devices to use UHR PPDUs (as opposed to NDPs) for sounding, which may further improve the signaling efficiency of sounding procedures between communication devices.

Figure 13:
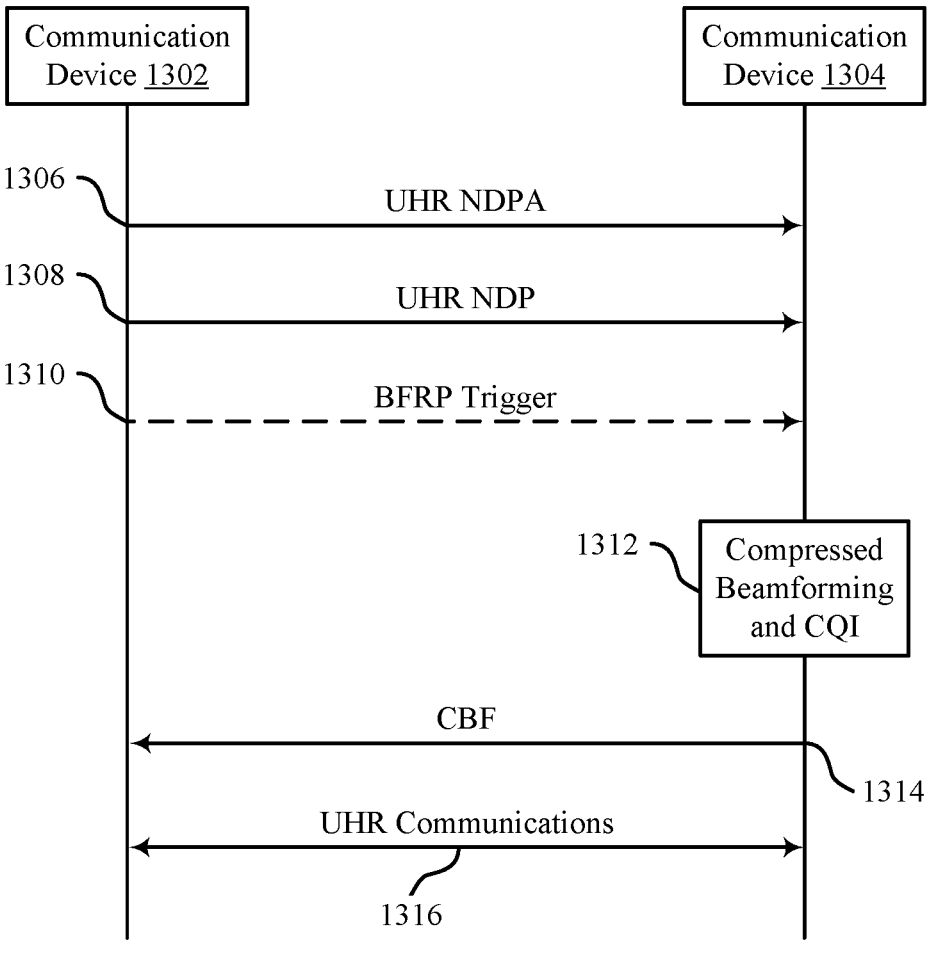
FIGS. 13 and 14 show examples of process flows that support sounding techniques for UHR communications.

FIG. 13 shows an example of a process flow 1300 that supports sounding techniques for UHR communications. The process flow 1300 may implement or be implemented by aspects of the WLAN 100. For example, the process flow 1300 includes a communication device 1302 and a communication device 1304, which may be examples of corresponding devices described herein, such as the wireless AP 102 or the wireless STAs 104 described with reference to FIG. 1. In the following description of the process flow 1300, operations between the communication device 1302 and the communication device 1304 may be added, omitted, or performed in a different order (with respect to the exemplary order shown).

At 1306, the communication device 1304 may receive a UHR NDPA variant from the communication device 1302.

The NDPA may include sounding information for communication devices that support UHR communications. In some implementations, the NDPA may include a sub-field that indicates the UHR variant/type of the NDPA. The length of this sub-field may be 4 bits. Additionally, or alternatively, the UHR NDPA variant may include a STA Info field that includes a special or reserved AID (such as 2045), an NDPA Variant Extension sub-field, and one or more sounding parameters that apply to all beamformees. In other implementations, the last bit of a STA Info field in the UHR NDPA may be set to a specific value (for example, 1) to indicate sounding information that pertains to UHR STAs.

At 1308, the communication device 1304 may receive a UHR NDP from the communication device 1302 in accordance with the sounding information indicated by the UHR NDPA. For example, the communication device 1304 may receive the UHR NDP from the communication device 1302 in accordance with a non-trigger-based sounding mode, a trigger-based sounding mode, an uplink sounding mode, a joint sounding mode, or a multi-AP sounding mode indicated by the UHR NDPA. In some implementations, rather than transmitting a separate UHR NDP, the communication device 1304 may transmit a UHR PPDU with an indication that the UHR PPDU can be used for sounding.

In some implementations (for example, for trigger-based sounding), the communication device 1302 may transmit a BFRP trigger frame at 1310. The BFRP trigger frame may indicate parameters to use for transmission of a CBF associated with the UHR NDP. In other implementations, (for example, for non-trigger-based sounding), these parameters may be included in or indicated by the UHR NDPA from the communication device 1302. Alternatively, the transmit parameters may be selected by the communication device 1304 (for example, based on compressed beamforming and CQI estimates).

At 1312, the communication device 1304 may perform compressed beamforming and CQI estimation based on receiving and measuring the UHR NDP from the communication device 1302 using the common sounding parameters indicated by the UHR NDPA.

At 1314, the communication device 1304 may transmit a CBF indicating the determined beamforming parameters, CQI estimates, and other feedback information. In some implementations, the CBF may include a buffer status report for the communication device 1304. As described herein, the communication device 1304 may transmit the CBF using the parameters indicated by the BFRP trigger frame (for trigger-based sounding) or the UHR NDPA (for non-trigger-based sounding).

At 1316, the communication device 1302 may perform UHR communications with the communication device 1304 using parameters that are based on the CBF provided by the communication device 1304. For example, the communication device 1302 may use beamforming information, CQI estimates, or buffer status information report provided by the communication device 1304 to select or otherwise determine which parameters to use for the UHR communications.

Figure 14:
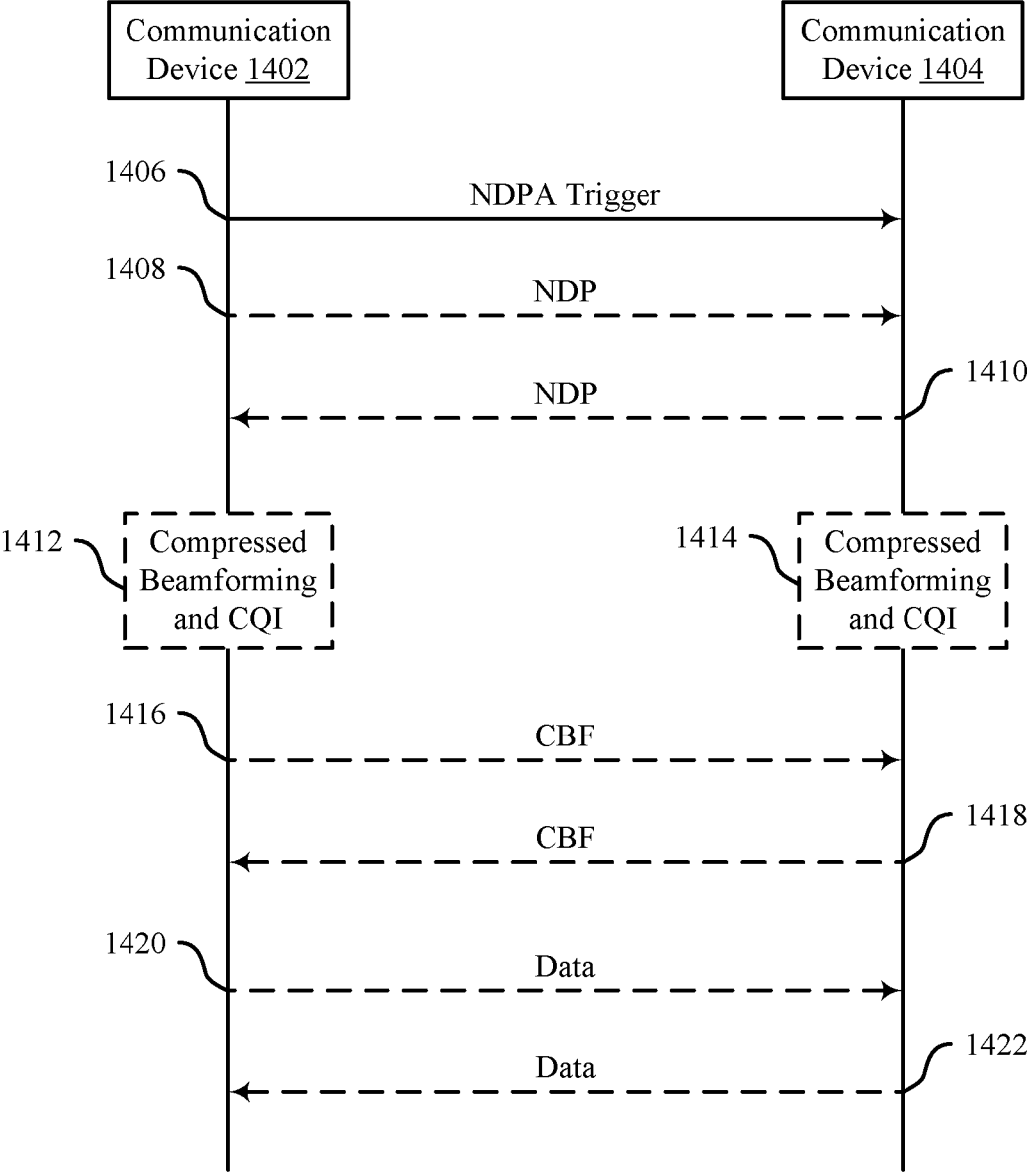

FIG. 14 shows an example of a process flow 1400 that supports sounding techniques for UHR communications. The process flow 1400 may implement or be implemented by aspects of the WLAN 100. For example, the process flow 1400 includes a communication device 1402 and a communication device 1404, which may be examples of corresponding devices described herein, such as the wireless AP 102 or the wireless STAs 104 described with reference to FIG. 1. In the following description of the process flow 1400, operations between the communication device 1402 and the communication device 1404 may be added, omitted, or performed in a different order (with respect to the exemplary order shown).

At 1406, the communication device 1402 may transmit an NDPA trigger frame to the communication device 1404. The NDPA trigger frame may indicate a sounding mode to use for transmission of an upcoming NDP, a set of parameters to use for transmission of a CBF associated with the upcoming NDP, and other sounding parameters. A Trigger Type field of the NDPA trigger frame may, in some implementations, indicate a variant of the NDPA trigger frame (for example, UHR, HE, EHT). The Trigger Type field may have a length of 4 bits. The NDPA trigger frame also may include a User Info List field that indicates additional or alternative sounding parameters. The NDPA trigger frame may, in some implementations, be included in a UHR PPDU.

In some implementations, the communication device 1402 may transmit an NDP to the communication device 1404 at 1408. The communication device 1402 may transmit the NDP using the sounding mode indicated by a Common Info field of the NDPA trigger frame. In some other implementations (such as for trigger-based uplink MU sounding), the communication device 1404 may transmit an NDP to the communication device 1402. The communication device 1404 may transmit the NDP using the sounding mode indicated by the Common Info field of the NDPA trigger frame.

For cases in which the communication device 1402 receives an NDP from the communication device 1404 at 1410, the communication device 1402 may perform compressed beamforming and CQI estimation at 1412 (for example, by performing measurements of the NDP). For cases in which the communication device 1404 receives the NDP from the communication device 1402, the communication device 1404 may perform compressed beamforming and CQI estimation at 1414. The compressed beamforming and CQI estimation may be performed according to the various sounding parameters and transmit parameters indicated by the NDPA trigger frame.

In some implementations, the communication device 1402 may transmit a CBF back to the communication device 1404 at 1416. The communication device 1402 may transmit the CBF using the transmit parameters indicated by the NDPA trigger frame. In some other implementations, the communication device 1404 may transmit a CBF back to the communication device 1402 at 1418. The communication device 1404 may transmit the CBF using the transmit parameters indicated by the NDPA trigger frame. The CBF (s) may include an indication of compressed beamforming information, a CQI estimate, feedback information, a buffer status report, etc.

In some implementations, after transmitting or receiving the CBF, the communication device 1402 may transmit data to the communication device 1404 at 1420. Additionally, or alternatively, the communication device 1404 may transmit data to the communication device 1402 at 1422. The data may, in some implementations, be aggregated or combined with a Basic Trigger frame or a BA. For example, if a UHR NDP from the communication device 1402 indicates that the communication device 1402 has pending uplink or downlink data, the communication device 1404 may transmit a Basic Trigger frame (with or without data) to solicit the pending data from the communication device 1402.

Figure 15:
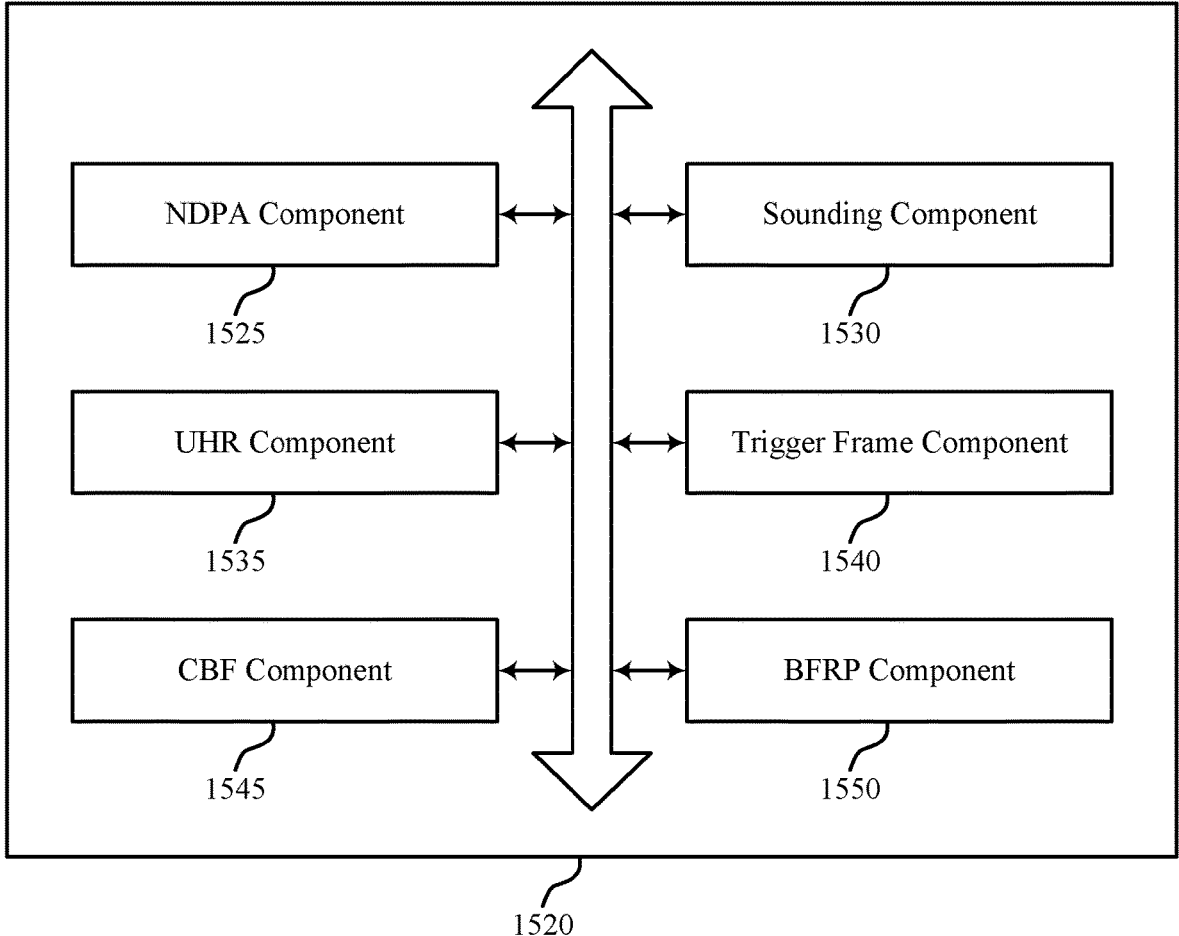
FIG. 15 shows a block diagram of an example wireless communication device that supports sounding techniques for UHR communications.
Figure 15:

FIG. 15 shows a block diagram of an example wireless communication device 1500 that supports sounding techniques for UHR communications according to some aspects of the present disclosure. In various examples, the wireless communication device 1500 can be a chip, SoC, chipset, package or device that may include: one or more modems (such as, a Wi-Fi (IEEE 802.11) modem or a cellular modem such as 3GPP 4G LTE or 5G compliant modem); one or more processors, processing blocks or processing elements (collectively "the at least one processor"); one or more radios (collectively "the radio"); and one or more memories or memory blocks (collectively "the at least one memory").

In some implementations, the wireless communication device 1500 can be a device for use in a STA, such as STA 104 described with reference to FIG. 1. In some other implementations, the wireless communication device 1500 can be a STA that includes such a chip, SoC, chipset, package, or device as well as multiple antennas. The wireless communication device 1500 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some implementations, the wireless communication device 1500 also includes or can be coupled with an application processor which may be further coupled with another memory. In some implementations, the wireless communication device 1500 further includes a user interface (UI) (such as a touchscreen or keypad) and a display, which may be integrated with the UI to form a touchscreen display. In some implementations, the wireless communication device 1500 may further include one or more sensors such as, for example, one or more inertial sensors, accelerometers, temperature sensors, pressure sensors, or altitude sensors.

The wireless communication device 1500 includes an NDPA component 1525, a sounding component 1530, an UHR component 1535, a trigger frame component 1540, a CBF component 1545, and an BFRP component 1550. Portions of the one or more of the NDPA component 1525, the sounding component 1530, the UHR component 1535, the trigger frame component 1540, the CBF component 1545, and the BFRP component 1550 may be implemented at least in part in the hardware or firmware. For example, one or more of the NDPA component 1525, the sounding component 1530, the UHR component 1535, the trigger frame component 1540, the CBF component 1545, and the BFRP component 1550 may be implemented at least in part by a modem. In some implementations, at least some of the NDPA component 1525, the sounding component 1530, the UHR component 1535, the trigger frame component 1540, the CBF component 1545, and the BFRP component 1550 are implemented at least in part by at least one processor and as software stored in memory. For example, portions of one or more of the NDPA component 1525, the sounding component 1530, the UHR component 1535, the trigger frame component 1540, the CBF component 1545, and the BFRP component 1550 can be implemented as non-transitory instructions (or "code") executable by the at least one processor to perform the functions or operations of the respective module.

In some implementations, the at least one processor may be a component of a processing system. A processing system may generally refer to a system or series of machines or components that receives inputs and processes the inputs to produce a set of outputs (which may be passed to other systems or components of, for example, the device 1500). For example, a processing system of the device 1500 may refer to a system including the various other components or subcomponents of the device 1500, such as the at least one processor, or a transceiver, or a communications manager, or other components or combinations of components of the device 1500. The processing system of the device 1500 may interface with other components of the device 1500, and may process information received from other components (such as inputs or signals) or output information to other components. For example, a chip or modem of the device 1500 may include a processing system, a first interface to output information and a second interface to obtain information.

In some implementations, the first interface may refer to an interface between the processing system of the chip or modem and a transmitter, such that the device 1500 may transmit information output from the chip or modem. In some implementations, the second interface may refer to an interface between the processing system of the chip or modem and a receiver, such that the device 1500 may obtain information or signal inputs, and the information may be passed to the processing system. A person having ordinary skill in the art will readily recognize that the first interface also may obtain information or signal inputs, and the second interface also may output information or signal outputs.

The STA 1520 may support wireless communications at a first communication device (such as the device 1500) in accordance with examples disclosed herein. The NDPA component 1525 is capable of, configured to, or operable to support a means for receiving an NDPA frame associated with a UHR NDPA variant type, the NDPA frame including sounding information for communication devices that support UHR communications. The sounding component 1530 is capable of, configured to, or operable to support a means for receiving an NDP in accordance with the sounding information from the NDPA frame associated with the UHR NDPA variant type based on a capability of the first communication device to support UHR communications. The UHR component 1535 is capable of, configured to, or operable to support a means for performing UHR communications with a second communication device according to the capability of the first communication device to support UHR communications using one or more communication parameters that are based on measurements of the NDP.

In some implementations, to support receiving the NDPA frame, the NDPA component 1525 is capable of, configured to, or operable to support a means for receiving, via the NDPA frame, a sounding dialog token field including a four-bit NDPA variant type sub-field that indicates the UHR NDPA variant type of the NDPA frame.

In some implementations, to support receiving the NDPA frame, the NDPA component 1525 is capable of, configured to, or operable to support a means for receiving, via the NDPA frame, a STA information field including an association identifier associated with the UHR NDPA variant type, an NDPA variant extension sub-field that indicates the UHR NDPA variant type, one or more beamforming parameters that pertain to a sounding sequence associated with the NDP, a sounding mode for transmission of the NDP, or a combination thereof.

In some implementations, the sounding mode includes a non-trigger-based sounding mode, a trigger-based sounding mode, an uplink sounding mode, a joint sounding mode, or a multi-AP sounding mode.

In some implementations, to support receiving the NDPA frame, the NDPA component 1525 is capable of, configured to, or operable to support a means for receiving, via the NDPA frame, a last bit of a STA information field indicating the UHR NDPA variant type of the NDPA frame.

In some implementations, the CBF component 1545 is capable of, configured to, or operable to support a means for transmitting a CBF based on receiving the NDP, where the CBF indicates compressed beamforming information associated with the NDP, a CQI associated with the NDP, or both.

In some implementations, the BFRP component 1550 is capable of, configured to, or operable to support a means for receiving a BFRP trigger frame in accordance with a trigger-based sounding mode, where transmitting the CBF is based on receiving the BFRP trigger frame.

Additionally, or alternatively, the STA 1520 may support wireless communications at a first communication device (such as the device 1500) in accordance with examples disclosed herein. The trigger frame component 1540 is capable of, configured to, or operable to support a means for receiving a trigger frame that indicates an NDPA, a sounding mode for transmission of an NDP associated with the NDPA, and a set of parameters for transmission of a CBF associated with the NDP. In some implementations, the sounding component 1530 is capable of, configured to, or operable to support a means for receiving or transmitting the NDP associated with the NDPA in accordance with the sounding mode indicated by the trigger frame. The CBF component 1545 is capable of, configured to, or operable to support a means for transmitting or receiving the CBF associated with the NDP in accordance with the set of parameters indicated by the trigger frame.

In some implementations, to support receiving the trigger frame, the trigger frame component 1540 is capable of, configured to, or operable to support a means for receiving, via the trigger frame, a four-bit trigger type field indicating the NDPA.

In some implementations, to support receiving the trigger frame, the trigger frame component 1540 is capable of, configured to, or operable to support a means for receiving, via the trigger frame, a common information field indicating one or more parameters associated with the NDPA, the one or more parameters including a variant type of the NDPA, the sounding mode for transmission of the NDP, one or more beamforming parameters that pertain to a sounding sequence associated with the NDP, or a combination thereof.

In some implementations, to support receiving the trigger frame, the trigger frame component 1540 is capable of, configured to, or operable to support a means for receiving, via the trigger frame, a common information field indicating one or more trigger-based sounding parameters associated with the NDPA, the one or more trigger-based sounding parameters including UL length, UL bandwidth, GI and LTF type, an AP transmit power, or a combination thereof.

In some implementations, the one or more trigger-based sounding parameters are omitted from the trigger frame if a non-trigger-based sounding mode is used for transmission of the NDP.

In some implementations, to support receiving the trigger frame, the trigger frame component 1540 is capable of, configured to, or operable to support a means for receiving, via the trigger frame, a user information list field including one or more user information sub-fields that are valid for trigger-based sounding.

In some implementations, to support receiving the trigger frame, the trigger frame component 1540 is capable of, configured to, or operable to support a means for receiving, via the trigger frame, a user information list field including a trigger dependent user information sub-field that indicates per-user sounding parameters to use for reception of the NDP.

In some implementations, a non-trigger-based sounding mode is used for transmission of the NDP. In some implementations, the trigger frame includes a user information field or a common information field that includes content from one or more STA information sub-fields.

In some implementations, to support transmitting or receiving the CBF, the CBF component 1545 is capable of, configured to, or operable to support a means for transmitting the CBF using one or more transmit parameters selected by the first communication device.

In some implementations, to support receiving the trigger frame, the trigger frame component 1540 is capable of, configured to, or operable to support a means for receiving, via the trigger frame, an UL length field indicating a UL PPDU duration of the NDP.

In some implementations, the UHR component 1535 is capable of, configured to, or operable to support a means for receiving an UHR PPDU, where a SIG-A field of the UHR PPDU includes a bit to indicate whether the UHR PPDU can be used for sounding.

In some implementations, to support receiving the UHR PPDU, the UHR component 1535 is capable of, configured to, or operable to support a means for receiving, via the UHR PPDU, one or both of the SIG-A field or a SIG-B field including one or both of a BSS color sub-field or a UL flag sub-field that indicate one or more communication devices to which the UHR PPDU is applicable.

In some implementations, the UHR PPDU includes the trigger frame indicating the NDPA. In some implementations, the trigger frame includes a duplicate of the UHR PPDU.

Figure 16:
FIG. 16 shows a block diagram of an example wireless communication device that supports sounding techniques for UHR communications.

FIG. 16 shows a block diagram of an example wireless communication device 1600 that supports sounding techniques for UHR communications according to some aspects of the present disclosure. In various examples, the wireless communication device 1600 can be a chip, SoC, chipset, package or device that may include: one or more modems (such as, a Wi-Fi (IEEE 802.11) modem or a cellular modem such as 3GPP 4G LTE or 5G compliant modem); one or more processors, processing blocks or processing elements (collectively "the at least one processor"); one or more radios (collectively "the radio"); and one or more memories or memory blocks (collectively "the at least one memory").

In some implementations, the wireless communication device 1600 can be a device for use in an AP, such as AP 102 described with reference to FIG. 1. In some other implementations, the wireless communication device 1600 can be an AP that includes such a chip, SoC, chipset, package, or device as well as multiple antennas. The wireless communication device 1600 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some implementations, the wireless communication device 1600 also includes or can be coupled with an application processor which may be further coupled with another memory. In some implementations, the wireless communication device 1600 further includes at least one external network interface that enables communication with a core network or backhaul network to gain access to external networks including the Internet.

The wireless communication device 1600 includes an NDPA frame component 1625, an NDP component 1630, an UHR communication component 1635, a CBF report component 1645, a MAP component 1650, a triggering component 1655, and a beacon frame component 1660. Portions of the one or more of the NDPA frame component 1625, the NDP component 1630, the UHR communication component 1635, the CBF report component 1645, the MAP component 1650, the triggering component 1655, and the beacon frame component 1660 may be implemented at least in part in the hardware or firmware. For example, one or more of the NDPA frame component 1625, the NDP component 1630, the UHR communication component 1635, the CBF report component 1645, the MAP component 1650, the triggering component 1655, and the beacon frame component 1660 may be implemented at least in part by a modem. In some implementations, at least some of the NDPA frame component 1625, the NDP component 1630, the UHR communication component 1635, the CBF report component 1645, the MAP component 1650, the triggering component 1655, and the beacon frame component 1660 are implemented at least in part by at least one processor and as software stored in memory. For example, portions of one or more of the NDPA frame component 1625, the NDP component 1630, the UHR communication component 1635, the CBF report component 1645, the MAP component 1650, the triggering component 1655, and the beacon frame component 1660 can be implemented as non-transitory instructions (or "code") executable by the at least one processor to perform the functions or operations of the respective module.

In some implementations, the at least one processor may be a component of a processing system. A processing system may generally refer to a system or series of machines or components that receives inputs and processes the inputs to produce a set of outputs (which may be passed to other systems or components of, for example, the device 1600). For example, a processing system of the device 1600 may refer to a system including the various other components or subcomponents of the device 1600, such as the at least one processor, or a transceiver, or a communications manager, or other components or combinations of components of the device 1600. The processing system of the device 1600 may interface with other components of the device 1600, and may process information received from other components (such as inputs or signals) or output information to other components. For example, a chip or modem of the device 1600 may include a processing system, a first interface to output information and a second interface to obtain information.

In some implementations, the first interface may refer to an interface between the processing system of the chip or modem and a transmitter, such that the device 1600 may transmit information output from the chip or modem. In some implementations, the second interface may refer to an interface between the processing system of the chip or modem and a receiver, such that the device 1600 may obtain information or signal inputs, and the information may be passed to the processing system. A person having ordinary skill in the art will readily recognize that the first interface also may obtain information or signal inputs, and the second interface also may output information or signal outputs.

The AP 1620 may support wireless communications at a second communication device (such as the device 1600) in accordance with examples disclosed herein. The NDPA frame component 1625 is capable of, configured to, or operable to support a means for transmitting an NDPA frame associated with an UHR NDPA variant type, the NDPA frame including sounding information for communication devices that support UHR communications. The NDP component 1630 is capable of, configured to, or operable to support a means for transmitting an NDP in accordance with the sounding information from the NDPA frame associated with the UHR NDPA variant type based on a capability of the second communication device to support UHR communications. The UHR communication component 1635 is capable of, configured to, or operable to support a means for performing UHR communications with a first communication device according to the capability of the second communication device to support UHR communications using one or more communication parameters that are based on measurements of the NDP.

Additionally, or alternatively, the AP 1620 may support wireless communications at a second communication device (such as the device 1600) in accordance with examples disclosed herein. The triggering component 1655 is capable of, configured to, or operable to support a means for transmitting a trigger frame that indicates an NDPA, a sounding mode for transmission of an NDP associated with the NDPA, and a set of parameters for transmission of a CBF associated with the NDP. In some implementations, the NDP component 1630 is capable of, configured to, or operable to support a means for transmitting or receiving the NDP associated with the NDPA in accordance with the sounding mode indicated by the trigger frame. The CBF report component 1645 is capable of, configured to, or operable to support a means for receiving or transmitting the CBF associated with the NDP in accordance with the set of parameters indicated by the trigger frame.

In some implementations, the UHR communication component 1635 is capable of, configured to, or operable to support a means for receiving respective UHR NDPs from one or more STAs in accordance with the NDPA indicated by the trigger frame, where the respective UHR NDPs include CBFs associated with the trigger frame, buffer status reports associated with the one or more STAs, or both.

In some implementations, the triggering component 1655 is capable of, configured to, or operable to support a means for transmitting a second trigger frame that indicates transmit parameters for each of the one or more STAs, where the transmit parameters are based on the buffer status reports in the respective UHR NDPs from the one or more STAs, channel status estimates derived from the respective UHR NDPs, or both.

In some implementations, the second trigger frame is aggregated with pending data from the second communication device. In some implementations, the second trigger frame is used to solicit pending data from the one or more stations.

In some implementations, the MAP component 1650 is capable of, configured to, or operable to support a means for receiving respective UHR NDPs from one or more APs in accordance with the NDPA indicated by the trigger frame.

In some implementations, the MAP component 1650 is capable of, configured to, or operable to support a means for transmitting uplink data to at least a first AP of the one or more AP based on measurements of the respective UHR NDPs.

In some implementations, the triggering component 1655 is capable of, configured to, or operable to support a means for transmitting a second trigger frame to at least a first AP of the one or more APs based on determining that the first AP has pending downlink data. In some implementations, the MAP component 1650 is capable of, configured to, or operable to support a means for receiving some or all of the pending downlink data from the first AP in accordance with the second trigger frame.

In some implementations, the beacon frame component 1660 is capable of, configured to, or operable to support a means for receiving a beacon frame from the first AP while the second communication device is in a power saving mode, where a TIM element of the beacon frame indicates the pending downlink data of the first AP.

In some implementations, the CBF report component 1645 is capable of, configured to, or operable to support a means for selecting one or more transmit parameters based on the CBF. In some implementations, the UHR communication component 1635 is capable of, configured to, or operable to support a means for transmitting downlink data to a first wireless communication device using the one or more transmit parameters.

FIG. 17 shows a flowchart illustrating an example process 1700 performable at a first wireless communication device (such as a wireless STA) that supports sounding techniques for UHR communications according to some aspects of the present disclosure. The operations of the process 1700 may be an example of a method implemented by a wireless STA or components thereof. For example, the process 1700 may be performed by the wireless communication device 1500 described with reference to FIG. 15, operating as or within a wireless STA. In some implementations, the process 1700 may be performed by a wireless STA, such as one of the STAs 104 described with reference to FIG. 1.

In some implementations, at 1705, the first communication device may receive an NDPA frame associated with an UHR NDPA variant type, the NDPA frame including sounding information for communication devices that support UHR communications. The operations of 1705 may be performed in accordance with examples disclosed herein. In some implementations, aspects of the operations of 1705 may be performed by an NDPA component 1525, as described with reference to FIG. 15.

In some implementations, at 1710, the first communication device may receive an NDP in accordance with the sounding information from the NDPA frame associated with the UHR NDPA variant type based on a capability of the first communication device to support UHR communications. The operations of 1710 may be performed in accordance with examples disclosed herein. In some implementations, aspects of the operations of 1710 may be performed by a sounding component 1530, as described with reference to FIG. 15.

In some implementations, at 1715, the first communication device may perform UHR communications with a second communication device according to the capability of the first communication device to support UHR communications using one or more communication parameters that are based on measurements of the NDP. The operations of 1715 may be performed in accordance with examples disclosed herein. In some implementations, aspects of the operations of 1715 may be performed by an UHR component 1535, as described with reference to FIG. 15.

FIG. 18 shows a flowchart illustrating an example process 1800 performable at a first communication device (such as a wireless STA or a wireless AP) that supports sounding techniques for UHR communications according to some aspects of the present disclosure. The operations of the process 1800 may be an example of a method implemented by a wireless STA or a wireless AP. For example, the process 1800 may be performed by a wireless communication device 1500 described with reference to FIG. 15, operating as or within a wireless STA or a wireless AP. In some implementations, the process 1800 may be performed by the AP 102 or one of the STAs 104 described with reference to FIG. 1.

In some implementations, at 1805, the first communication device may receive a trigger frame that indicates an NDPA, a sounding mode for transmission of an NDP associated with the NDPA, and a set of parameters for transmission of a CBF associated with the NDP. The operations of 1805 may be performed in accordance with examples disclosed herein. In some implementations, aspects of the operations of 1805 may be performed by a trigger frame component 1540, as described with reference to FIG. 15.

In some implementations, at 1810, the first communication device may receive or transmit the NDP associated with the NDPA in accordance with the sounding mode indicated by the trigger frame. The operations of 1810 may be performed in accordance with examples disclosed herein. In some implementations, aspects of the operations of 1810 may be performed by a sounding component 1530, as described with reference to FIG. 15.

In some implementations, at 1815, the first communication device may transmit or receive the CBF associated with the NDP in accordance with the set of parameters indicated by the trigger frame. The operations of 1815 may be performed in accordance with examples disclosed herein. In some implementations, aspects of the operations of 1815 may be performed by a CBF component 1545, as described with reference to FIG. 15.

FIG. 19 shows a flowchart illustrating an example process 1900 performable at a second wireless communication device (such as a wireless AP) that supports sounding techniques for UHR communications according to some aspects of the present disclosure. The operations of the process 1900 may be an example of a method implemented by a wireless AP or components thereof. For example, the process 1900 may be performed by the wireless communication device 1600 described with reference to FIG. 16, operating as or within a wireless AP. In some implementations, the process 1900 may be performed by the AP 102 described with reference to FIG. 1.

In some implementations, at 1905, the second communication device may transmit an NDPA frame associated with an UHR NDPA variant type, the NDPA frame including sounding information for communication devices that support UHR communications. The operations of 1905 may be performed in accordance with examples disclosed herein. In some implementations, aspects of the operations of 1905 may be performed by an NDPA frame component 1625, as described with reference to FIG. 16.

In some implementations, at 1910, the second communication device may transmit an NDP in accordance with the sounding information from the NDPA frame associated with the UHR NDPA variant type based on a capability of the second communication device to support UHR communications. The operations of 1910 may be performed in accordance with examples disclosed herein. In some implementations, aspects of the operations of 1910 may be performed by an NDP component 1630, as described with reference to FIG. 16.

In some implementations, at 1915, the second communication device may perform UHR communications with a first communication device according to the capability of the second communication device to support UHR communications using one or more communication parameters that are based on measurements of the NDP. The operations of 1915 may be performed in accordance with examples disclosed herein. In some implementations, aspects of the operations of 1915 may be performed by an UHR communication component 1635, as described with reference to FIG. 16.

FIG. 20 shows a flowchart illustrating an example process 2000 performable at a second communication device (such as a wireless AP or a wireless STA) that supports sounding techniques for UHR communications according to some aspects of the present disclosure. The operations of the process 2000 may be an example of a method implemented by a wireless AP or a wireless STA. For example, the process 2000 may be performed by the wireless communication device 1600 described with reference to FIG. 16, operating as or within a wireless AP or a wireless STA. In some implementations, the process 2000 may be performed by the AP 102 or one of the STAs 104 described with reference to FIG. 1.

In some implementations, at 2005, the second communication device may transmit a trigger frame that indicates an NDPA, a sounding mode for transmission of an NDP associated with the NDPA, and a set of parameters for transmission of a CBF associated with the NDP. The operations of 2005 may be performed in accordance with examples disclosed herein. In some implementations, aspects of the operations of 2005 may be performed by a triggering component 1655, as described with reference to FIG. 16.

In some implementations, at 2010, the second communication device may transmit or receive the NDP associated with the NDPA in accordance with the sounding mode indicated by the trigger frame. The operations of 2010 may be performed in accordance with examples disclosed herein. In some implementations, aspects of the operations of 2010 may be performed by an NDP component 1630, as described with reference to FIG. 16.

In some implementations, at 2015, the second communication device may receive or transmit the CBF associated with the NDP in accordance with the set of parameters indicated by the trigger frame. The operations of 2015 may be performed in accordance with examples disclosed herein. In some implementations, aspects of the operations of 2015 may be performed by a CBF report component 1645, as described with reference to FIG. 16.

Implementation examples are described in the following numbered clauses:

Clause 1: A method for wireless communications at a first communication device, including: receiving an NDPA frame associated with a UHR NDPA variant type, the NDPA frame including sounding information for communication devices that support UHR communications; receiving a NDP in accordance with the sounding information from the NDPA frame associated with the UHR NDPA variant type based on a capability of the first communication device to support UHR communications; and performing UHR communications with a second communication device according to the capability of the first communication device to support UHR communications using one or more communication parameters that are based on measurements of the NDP.

Clause 2: The method of clause 1, where receiving the NDPA frame includes: receiving, via the NDPA frame, a sounding dialog token field including a four-bit NDPA variant type sub-field that indicates the UHR NDPA variant type of the NDPA frame.

Clause 3: The method of any of clauses 1 through 2, where receiving the NDPA frame includes: receiving, via the NDPA frame, a STA information field including an AID associated with the UHR NDPA variant type, an NDPA variant extension sub-field that indicates the UHR NDPA variant type, one or more beamforming parameters that pertain to a sounding sequence associated with the NDP, a sounding mode for transmission of the NDP, or a combination thereof.

Clause 4: The method of clause 3, where the sounding mode includes a non-trigger-based sounding mode, a trigger-based sounding mode, an uplink sounding mode, a joint sounding mode, or a MAP sounding mode.

Clause 5: The method of any of clauses 1 through 4, where receiving the NDPA frame includes: receiving, via the NDPA frame, a last bit of a STA information field indicating the UHR NDPA variant type of the NDPA frame.

Clause 6: The method of any of clauses 1 through 5, further including: transmitting a CBF based on receiving the NDP, where the CBF indicates compressed beamforming information associated with the NDP, a CQI associated with the NDP, or both.

Clause 7: The method of clause 6, further including: receiving a BFRP trigger frame in accordance with a trigger-based sounding mode, where transmitting the CBF is based on receiving the BFRP trigger frame.

Clause 8: A method for wireless communications at a first communication device, including: receiving a trigger frame that indicates an NDPA, a sounding mode for transmission of a NDP associated with the NDPA, and a set of parameters for transmission of a CBF associated with the NDP; receiving or transmitting the NDP associated with the NDPA in accordance with the sounding mode indicated by the trigger frame; and transmitting or receiving the CBF associated with the NDP in accordance with the set of parameters indicated by the trigger frame.

Clause 9: The method of clause 8, where receiving the trigger frame includes: receiving, via the trigger frame, a four-bit trigger type field indicating the NDPA.

Clause 10: The method of any of clauses 8 through 9, where receiving the trigger frame includes: receiving, via the trigger frame, a common information field indicating one or more parameters associated with the NDPA, the one or more parameters including a variant type of the NDPA, the sounding mode for transmission of the NDP, one or more beamforming parameters that pertain to a sounding sequence associated with the NDP, or a combination thereof.

Clause 11: The method of any of clauses 8 through 10, where receiving the trigger frame includes: receiving, via the trigger frame, a common information field indicating one or more trigger-based sounding parameters associated with the NDPA, the one or more trigger-based sounding parameters including a UL length, a UL bandwidth, a GI and LTF type, an AP transmit power, or a combination thereof.

Clause 12: The method of clause 11, where the one or more trigger-based sounding parameters are omitted from the trigger frame if a non-trigger-based sounding mode is used for transmission of the NDP.

Clause 13: The method of any of clauses 8 through 12, where receiving the trigger frame includes: receiving, via the trigger frame, a user information list field including one or more user information sub-fields that are valid for trigger-based sounding.

Clause 14: The method of any of clauses 8 through 13, where receiving the trigger frame includes: receiving, via the trigger frame, a user information list field including a trigger dependent user information sub-field that indicates per-user sounding parameters to use for reception of the NDP.

Clause 15: The method of any of clauses 8 through 14, where a non-trigger-based sounding mode is used for transmission of the NDP; and the trigger frame includes a user information field or a common information field that includes content from one or more STA information sub-fields.

Clause 16: The method of any of clauses 8 through 15, where transmitting or receiving the CBF includes: transmitting the CBF using one or more transmit parameters selected by the first communication device.

Clause 17: The method of any of clauses 8 through 16, where receiving the trigger frame includes: receiving, via the trigger frame, a UL length field indicating a UL PPDU duration of the NDP.

Clause 18: The method of any of clauses 8 through 17, further including: receiving a UHR PPDU, where a SIG-A field of the UHR PPDU includes a bit to indicate whether the UHR PPDU can be used for sounding.

Clause 19: The method of clause 18, where receiving the UHR PPDU includes: receiving, via the UHR PPDU, one or both of the SIG-A field or a SIG-B field including one or both of a BSS color sub-field or a UL flag sub-field that indicate one or more communication devices to which the UHR PPDU is applicable.

Clause 20: The method of any of clauses 18 through 19, where the UHR PPDU includes the trigger frame indicating the NDPA; and the trigger frame includes a duplicate of the UHR PPDU.

Clause 21: A method for wireless communications at a second communication device, including: transmitting an NDPA frame associated with a UHR NDPA variant type, the NDPA frame including sounding information for communication devices that support UHR communications; transmitting a NDP in accordance with the sounding information from the NDPA frame associated with the UHR NDPA variant type based on a capability of the second communication device to support UHR communications; and performing UHR communications with a first communication device according to the capability of the second communication device to support UHR communications using one or more communication parameters that are based on measurements of the NDP.

Clause 22: A method for wireless communications at a second communication device, including: transmitting a trigger frame that indicates an NDPA, a sounding mode for transmission of a NDP associated with the NDPA, and a set of parameters for transmission of a CBF associated with the NDP; transmitting or receiving the NDP associated with the NDPA in accordance with the sounding mode indicated by the trigger frame; and receiving or transmitting the CBF associated with the NDP in accordance with the set of parameters indicated by the trigger frame.

Clause 23: The method of clause 22, further including: receiving respective UHR NDPs from one or more STAs in accordance with the NDPA indicated by the trigger frame, where the respective UHR NDPs include CBFs associated with the trigger frame, buffer status reports associated with the one or more STAs, or both.

Clause 24: The method of clause 23, further including: transmitting a second trigger frame that indicates transmit parameters for each of the one or more STAs, where the transmit parameters are based on the buffer status reports in the respective UHR NDPs from the one or more STAs, channel status estimates derived from the respective UHR NDPs, or both.

Clause 25: The method of clause 24, where the second trigger frame is aggregated with pending data from the second communication device; and the second trigger frame is used to solicit pending data from the one or more STAs.

Clause 26: The method of any of clauses 22 through 25, further including: receiving respective UHR NDPs from one or more APs in accordance with the NDPA indicated by the trigger frame.

Clause 27: The method of clause 26, further including: transmitting uplink data to at least a first AP of the one or more APs based on measurements of the respective UHR NDPs.

Clause 28: The method of any of clauses 26 through 27, further including: transmitting a second trigger frame to at least a first AP of the one or more APs based on determining that the first AP has pending downlink data; and receiving some or all of the pending downlink data from the first AP in accordance with the second trigger frame.

Clause 29: The method of clause 28, further including: receiving a beacon frame from the first AP while the second communication device is in a power saving mode, where a TIM element of the beacon frame indicates the pending downlink data of the first AP.

Clause 30: The method of any of clauses 22 through 29, further including: selecting one or more transmit parameters based on the CBF; and transmitting downlink data to a first wireless communication device using the one or more transmit parameters.

Clause 31: An apparatus for wireless communications at a first communication device, including at least one processor, at least one memory coupled with the at least one processor, and instructions stored in the at least one memory and executable by the at least one processor to cause the apparatus to perform a method of any of clauses 1 through 7.

Clause 32: An apparatus for wireless communications at a first communication device, including at least one means for performing a method of any of clauses 1 through 7.

Clause 33: A non-transitory computer-readable medium storing code for wireless communications at a first communication device, the code including instructions executable by at least one processor to perform a method of any of clauses 1 through 7.

Clause 34: An apparatus for wireless communications at a first communication device, including at least one processor, at least one memory coupled with the at least one processor, and instructions stored in the at least one memory and executable by the at least one processor to cause the apparatus to perform a method of any of clauses 8 through 20.

Clause 35: An apparatus for wireless communications at a first communication device, including at least one means for performing a method of any of clauses 8 through 20.

Clause 36: A non-transitory computer-readable medium storing code for wireless communications at a first communication device, the code including instructions executable by at least one processor to perform a method of any of clauses 8 through 20.

Clause 37: An apparatus for wireless communications at a second communication device, including at least one processor, at least one memory coupled with the at least one processor, and instructions stored in the at least one memory and executable by the at least one processor to cause the apparatus to perform a method of any of clauses 21 through 21.

Clause 38: An apparatus for wireless communications at a second communication device, including at least one means for performing a method of any of clauses 21 through 21.

Clause 39: A non-transitory computer-readable medium storing code for wireless communications at a second communication device, the code including instructions executable by at least one processor to perform a method of any of clauses 21 through 21.

Clause 40: An apparatus for wireless communications at a second communication device, including at least one processor, at least one memory coupled with the at least one processor, and instructions stored in the at least one memory and executable by the at least one processor to cause the apparatus to perform a method of any of clauses 22 through 30.

Clause 41: An apparatus for wireless communications at a second communication device, including at least one means for performing a method of any of clauses 22 through 30.

Clause 42: A non-transitory computer-readable medium storing code for wireless communications at a second communication device, the code including instructions executable by at least one processor to perform a method of any of clauses 22 through 30.

As used herein, the term "determine" or "determining" encompasses a wide variety of actions and, therefore, "determining" can include calculating, computing, processing, deriving, investigating, looking up (such as via looking up in a table, a database, or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and shown in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other implementations without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some implementations be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. An apparatus for wireless communications at a first communication device, comprising:
   at least one processor;
   at least one memory coupled with the at least one processor; and
   instructions stored in the at least one memory and executable by the at least one processor to cause the apparatus to:
       receive a null data packet announcement frame associated with an ultra-high reliability null data packet announcement variant type, the null data packet announcement frame comprising sounding information for communication devices that support ultra-high reliability communications and a null data packet announcement variant extension sub-field that indicates the ultra-high reliability null data packet announcement variant type;

receive a null data packet in accordance with the sounding information from the null data packet announcement frame associated with the ultra-high reliability null data packet announcement variant type based at least in part on a capability of the first communication device to support ultra-high reliability communications; and perform ultra-high reliability communications with a second communication device according to the capability of the first communication device to support ultra-high reliability communications using one or more communication parameters that are based at least in part on measurements of the null data packet.

2. The apparatus of claim 1, wherein, to receive the null data packet announcement frame, the instructions are executable by the at least one processor to cause the apparatus to:

receive, via the null data packet announcement frame, a sounding dialog token field comprising a four-bit null data packet announcement variant type sub-field that indicates the ultra-high reliability null data packet announcement variant type of the null data packet announcement frame.

3. The apparatus of claim 1, wherein, to receive the null data packet announcement frame, the instructions are executable by the at least one processor to cause the apparatus to:

receive, via the null data packet announcement frame, a station information field comprising an association identifier associated with the ultra-high reliability null data packet announcement variant type, one or more beamforming parameters that pertain to a sounding sequence associated with the null data packet, a sounding mode for transmission of the null data packet, or a combination thereof.

4. The apparatus of claim 3, wherein the sounding mode comprises a non-trigger-based sounding mode, a trigger-based sounding mode, an uplink sounding mode, a joint sounding mode, or a multi-AP sounding mode.

5. The apparatus of claim 1, wherein, to receive the null data packet announcement frame, the instructions are executable by the at least one processor to cause the apparatus to:

receive, via the null data packet announcement frame, a last bit of a station information field indicating the ultra-high reliability null data packet announcement variant type of the null data packet announcement frame.

6. The apparatus of claim 1, wherein the instructions are further executable by the at least one processor to cause the apparatus to:

transmit a compressed beamforming frame based at least in part on receiving the null data packet, wherein the compressed beamforming frame indicates compressed beamforming information associated with the null data packet, a channel quality indicator associated with the null data packet, or both.

7. The apparatus of claim 6, wherein the instructions are further executable by the at least one processor to cause the apparatus to:

receive a beamforming report poll trigger frame in accordance with a trigger-based sounding mode, wherein transmitting the compressed beamforming frame is based at least in part on receiving the beamforming report poll trigger frame.

8. An apparatus for wireless communications at a second communication device, comprising:

at least one processor;

at least one memory coupled with the at least one processor; and instructions stored in the at least one memory and executable by the at least one processor to cause the apparatus to:

transmit a null data packet announcement frame associated with an ultra-high reliability null data packet announcement variant type, the null data packet announcement frame comprising sounding information for communication devices that support ultra-high reliability communications and a null data packet announcement variant extension sub-field that indicates the ultra-high reliability null data packet announcement variant type;

transmit a null data packet in accordance with the sounding information from the null data packet announcement frame associated with the ultra-high reliability null data packet announcement variant type based at least in part on a capability of the second communication device to support ultra-high reliability communications; and perform ultra-high reliability communications with a first communication device according to the capability of the second communication device to support ultra-high reliability communications using one or more communication parameters that are based at least in part on measurements of the null data packet.

9. The apparatus of claim 8, wherein, to transmit the null data packet announcement frame, the instructions are executable by the at least one processor to cause the apparatus to:

transmit, via the null data packet announcement frame, a sounding dialog token field comprising a four-bit null data packet announcement variant type sub-field that indicates the ultra-high reliability null data packet announcement variant type of the null data packet announcement frame.

10. The apparatus of claim 8, wherein, to transmit the null data packet announcement frame, the instructions are executable by the at least one processor to cause the apparatus to:

transmit, via the null data packet announcement frame, a station information field comprising an association identifier associated with the ultra-high reliability null data packet announcement variant type, one or more beamforming parameters that pertain to a sounding sequence associated with the null data packet, a sounding mode for transmission of the null data packet, or a combination thereof.

11. The apparatus of claim 10, wherein the sounding mode comprises a non-trigger-based sounding mode, a trigger-based sounding mode, an uplink sounding mode, a joint sounding mode, or a multi-AP sounding mode.

12. The apparatus of claim 8, wherein, to transmit the null data packet announcement frame, the instructions are executable by the at least one processor to cause the apparatus to:

transmit, via the null data packet announcement frame, a last bit of a station information field indicating the ultra-high reliability null data packet announcement variant type of the null data packet announcement frame.

13. The apparatus of claim 8, wherein the instructions are further executable by the at least one processor to cause the apparatus to:

receive a compressed beamforming frame based at least in part on transmitting the null data packet, wherein the compressed beamforming frame indicates compressed beamforming information associated with the null data packet, a channel quality indicator associated with the null data packet, or both.

14. The apparatus of claim 13, wherein the instructions are further executable by the at least one processor to cause the apparatus to:

transmit a beamforming report poll trigger frame in accordance with a trigger-based sounding mode, wherein receiving the compressed beamforming frame is based at least in part on transmitting the beamforming report poll trigger frame.

* * * * *